United States Patent
Sawada et al.

(10) Patent No.: US 7,039,546 B2
(45) Date of Patent: May 2, 2006

(54) POSITION INFORMATION ESTIMATION DEVICE, METHOD THEREOF, AND PROGRAM

(75) Inventors: Hiroshi Sawada, Nara (JP); Ryo Mukai, Nara (JP); Shoko Araki, Kyotanabe (JP); Shoji Makino, Machida (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 10/508,708

(22) PCT Filed: Mar. 3, 2004

(86) PCT No.: PCT/JP2004/002610

§ 371 (c)(1),
(2), (4) Date: Sep. 30, 2004

(87) PCT Pub. No.: WO2004/079388

PCT Pub. Date: Sep. 16, 2004

(65) Prior Publication Data

US 2005/0203981 A1 Sep. 15, 2005

(30) Foreign Application Priority Data

Mar. 4, 2003 (JP) .............................. 2003-057070
Aug. 21, 2003 (JP) .............................. 2003-297580

(51) Int. Cl.
*G01C 9/00* (2006.01)
(52) U.S. Cl. .................................. 702/150; 702/152
(58) Field of Classification Search ........ 702/150–152, 702/196
See application file for complete search history.

(56) References Cited

U.S. PATENT DOCUMENTS 6,243,471 B1 * 6/2001 Brandstein et al. ........... 381/92
6,625,587 B1 * 9/2003 Erten et al. .................... 706/22

FOREIGN PATENT DOCUMENTS

| JP | 2000-242624 | 9/2000 |
|---|---|---|
| JP | 2002-084593 | 3/2002 |
| JP | 2003-090871 | 3/2003 |
| JP | 2003-099093 | 4/2003 |
| JP | 2004-145172 | 5/2004 |
| WO | 98 58450 | 12/1998 |
| WO | 00 54404 | 9/2000 |

OTHER PUBLICATIONS

Masatoshi Nakamura, Yutaka Maeda, "DSP Implementation of Blind Signal Separation Using Simultaneous Pertubation Method." SICE 2002 Aug. 5-7, 2002, Osaka.*

(Continued)

*Primary Examiner*—John Barlow
*Assistant Examiner*—Jonathan Moffat
(74) *Attorney, Agent, or Firm*—Oblon, Spivak, McClelland, Maier & Neustadt, P.C.

(57) ABSTRACT

Signals from a plurality of sources are observed by a plurality of sensors disposed in two dimensions, and the observed signals are subject to a short-time Fourier transform, from which frequency domain signals are derived. Using the independent component analysis process on the frequency domain signals, separation matrices are produced, and an inverse matrix of each separation matrix is calculated. The direction of each source is calculated based on a ratio of a pair of elements in each column of the inverse matrix.

22 Claims, 22 Drawing Sheets

OTHER PUBLICATIONS

Kurita, Satoshi et al. "Evaluation of blind signal separation method using directivity pattern under reverberant conditions", Proc. ICASSP2000, pp. 3140-3143 2000.

Mukai, Ryo et al. "Array geometry arrangement for frequency domain blind source separation", IWAENC2003, pp. 219-222 2003.

Mukai, Ryo et al. "Frequency domain blind source separation using small and large spacing sensor pairs", ISCAS2004 2004.

Sawada, Hiroshi et al. "A robust and precise method for solving the permutation problem of frequency-domain blind source separation", ICA2003, pp. 505-510 2003.

Sawada, Hiroshi et al. "Direction of arrival estimation for multiple source signals using independent component analysis", ISSPA2003 2003.

Sawada, Hiroshi et al. "Solving the Permutation Problem in Frequency-Domain Blind Source Separation", The 2002 Autumn Meeting of the Acoustical Society of Japan, pp. 11, 541-542 2002.

Sawada, Hiroshi et al. "A Robust Approach to the Permutation Problem of Frequency-Domain Blind Source Separation", ICASSP, pp. v381-v384 2003.

Mukai, Ryo et al. "Frequency Domain BSS Using Large and Small Spacing Microphone Pairs", NTT Communication Science Laboratories 2004.

Mukai, Ryo et al. "BSS for Convolutive Mixtures", IWAENC 2003.

Sawada, Hiroshi et al. "A Robust Method for the Permutation Problem of Frequency-Domain Blind Source Separation", NTT Communication Science Laboratories, pp. 777-778 2003.

Sawada, Hiroshi et al. "A Robust and Precise Method for Solving the Permutation Problem of Frequency-Domain Blind Source Separation", IEEE 2004.

Mukai, Ryo et al. "A Solution for the Permutation Problem in Frequency Domain BSS Using Near-Field Model", NTT Communication Science Laboratories, pp. 589-590 2003.

Mukai, Ryo et al. "Near-Field Frequency Domain Blind Source Separation for Convolutive Mixtures", ICASSP 2004.

* cited by examiner

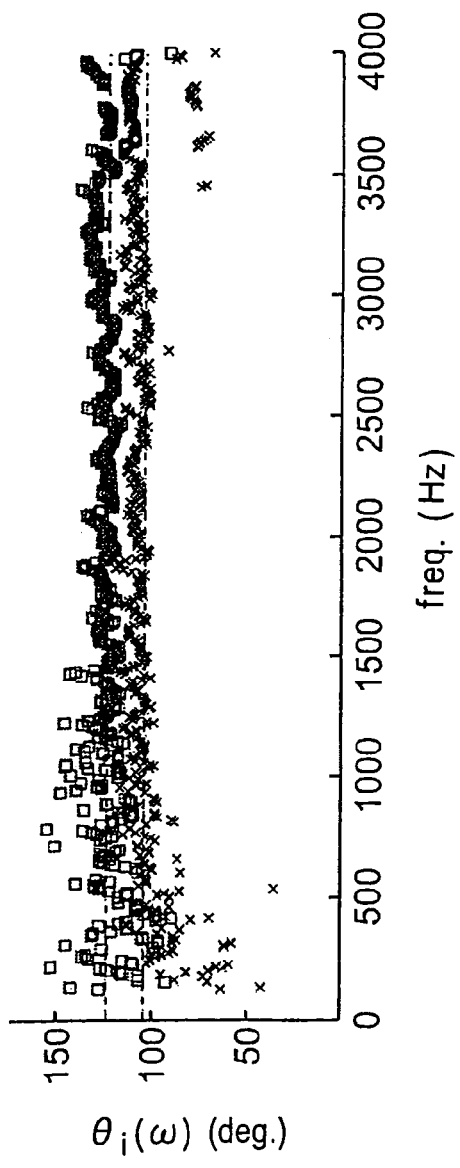
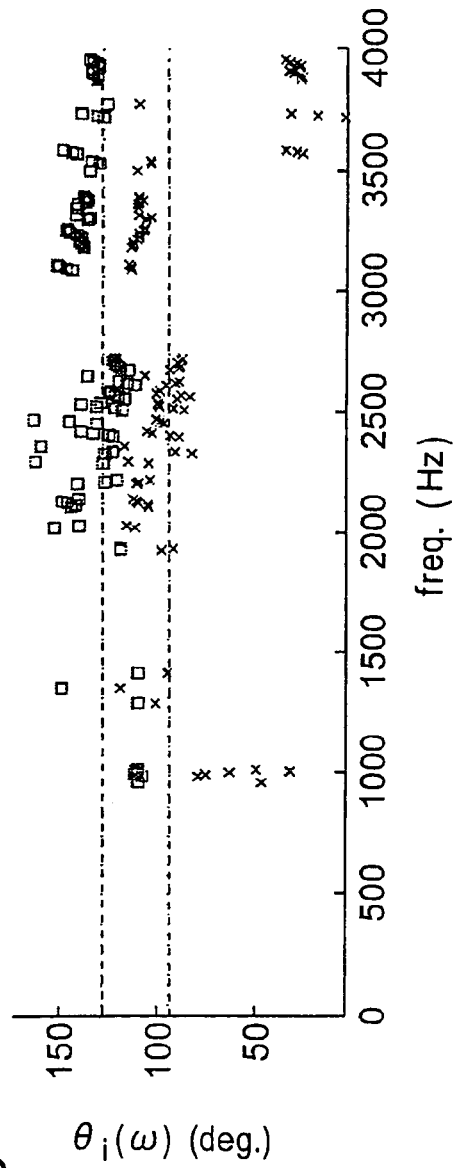
FIG. 11A
FIG. 11B

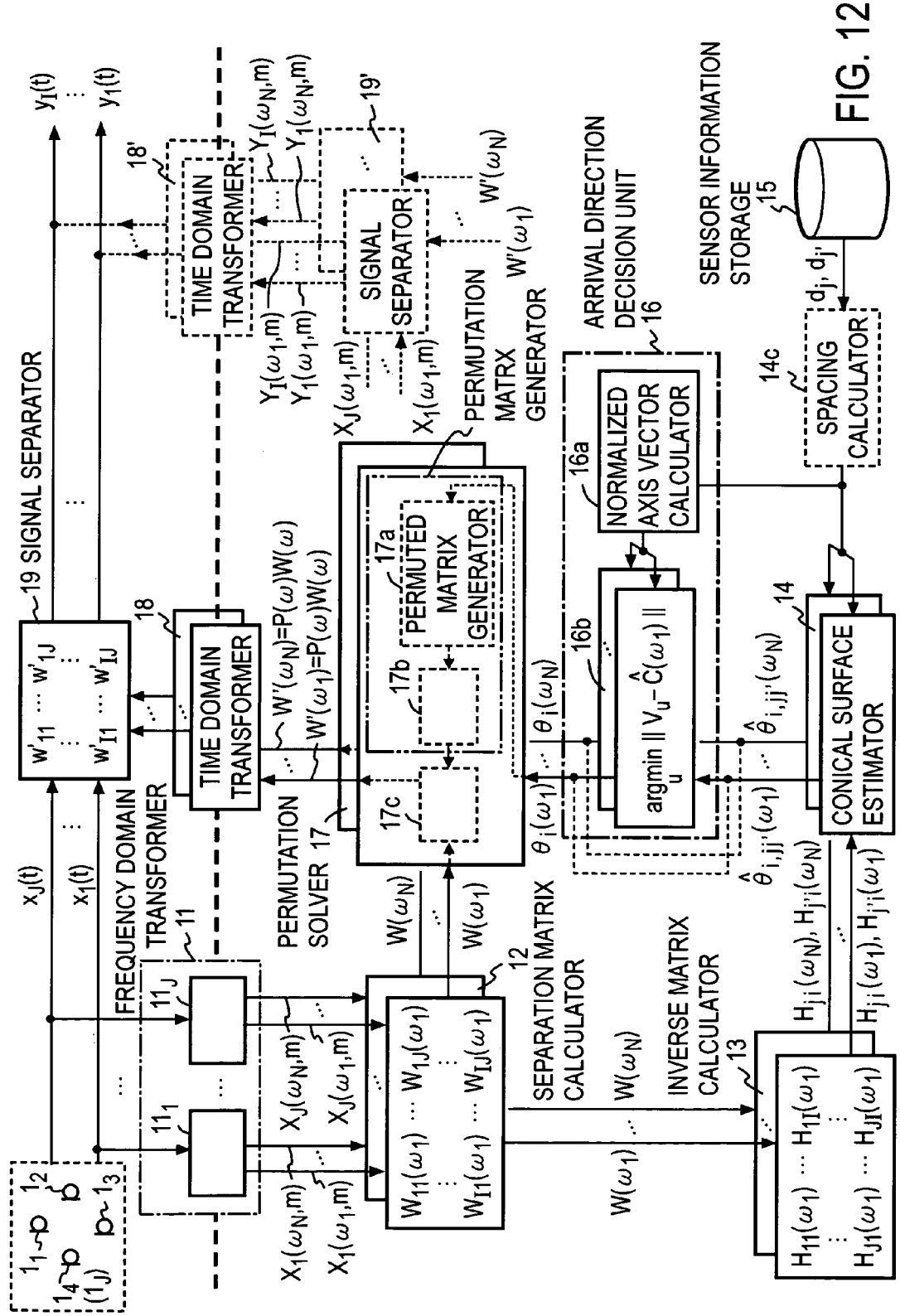

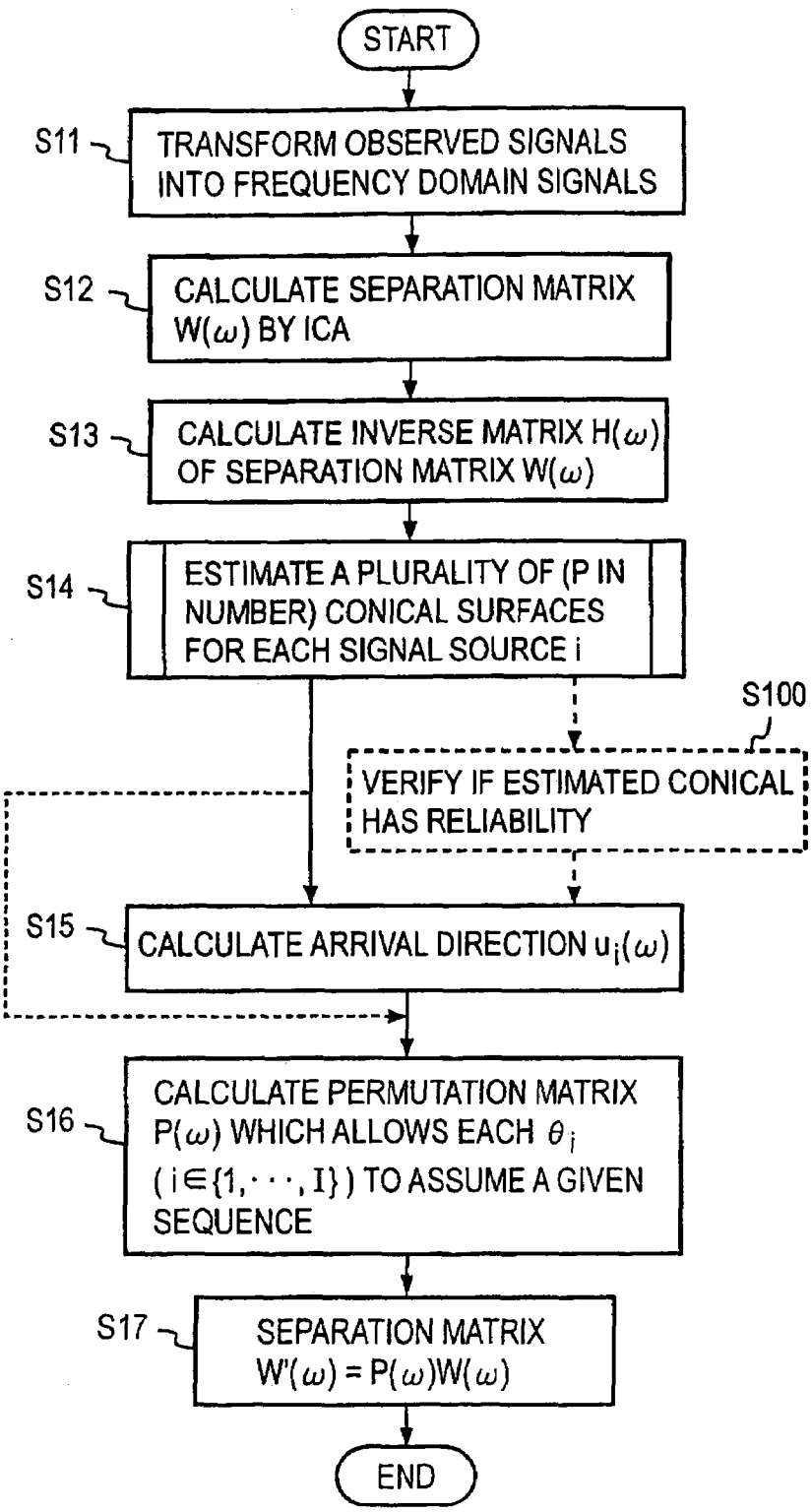

| | $SIR_1$ | $SIR_2$ | $SIR_3$ | $SIR_4$ | $SIR_5$ | $SIR_6$ | AVERAGE |
|---|---|---|---|---|---|---|---|
| INPUT SIR | −8.3 | −6.8 | −7.8 | −7.7 | −6.7 | −5.2 | −7.1 |
| C | 4.4 | 2.6 | 4.0 | 9.2 | 3.6 | −2.0 | 3.7 |
| D+C | 4.5 | 10.8 | 14.4 | 4.5 | 5.4 | 8.8 | 8.1 |
| D+S+C | 12.3 | 5.6 | 14.5 | 7.6 | 8.9 | 10.8 | 10.0 |

(dB)

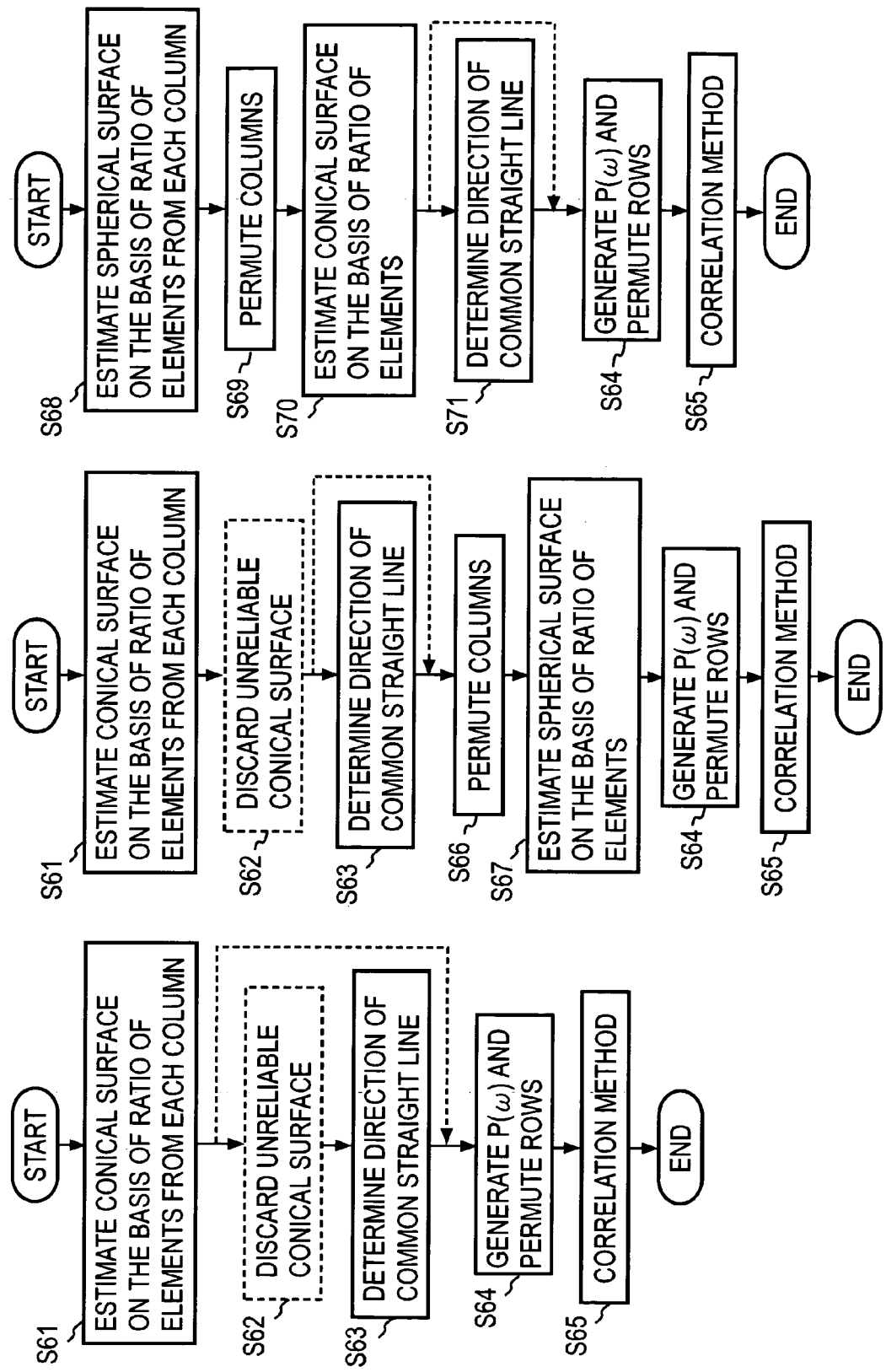

POSITION INFORMATION ESTIMATION DEVICE, METHOD THEREOF, AND PROGRAM

TECHNICAL FIELD

The present invention relates to an apparatus, a method and a program for estimation of positional information of each of a plurality of signal sources such as sound sources and radio wave sources on the basis of observation with a plurality of sensors of signals which are radiated from the signal sources and then mixed together, or more specifically, for estimation of information containing at least one of parameters which indicate the position to be used in the detection of arrival directions of signals and in the separation of signals into each signal source as well as in the recovery of signals.

BACKGROUND ART

The use of the independent component analysis (hereafter abbreviated as ICA) has been proposed to estimate arrival directions of source signals and to separate source signals from oncoming signals observed by a plurality of sensors when signals from a plurality of signal sources are mixed in the space before they reach the sensors. Mixing in the space results in a convolutive mixture in which certain signals are mixed with plural time delays inasmuch as arrival delay and attenuation factors from the signal sources to the sensors have different values for direct waves and for a plurality of reflected waves caused by propagation obstacles. ICA process which directly determines separation filters in the time domain is very slow in convergence to a final solution, and hence an approach which applies the ICA process to individual frequency in the frequency domain is more realistic.

ESTIMATION OF ARRIVAL DIRECTION

A conventional approach which uses the ICA process in the frequency domain to estimate the direction of a signal source as positional information will be briefly described with reference to FIG. 1. A linear array of J sensors $1_1, 1_2, \ldots, 1_J$ is provided. The position of a sensor $1_j$ (j=1, 2, ..., J) is denoted by $d_j$, and a signal observed by the sensor $1_j$ is denoted by $x_j(t)$. Considering a direction which is perpendicular to the direction of the array of sensors $1_1, \ldots, 1_J$ as 90°, it is assumed that the arrival direction of the source signal $s_i(t)$ lies in a range $0° \leq \theta_i \leq 180°$. It is supposed that a mixed signal of I source signals $s_1(t), \ldots, s_I(t)$ is detected by J sensors $1_1$ to $1_J$ as observed signals $x_1(t), \ldots, x_J(t)$.

The estimation of the arrival direction of a signal is made frequently in the frequency domain. At this end, the observed signal $x_j(t)$ is subject to a short-time Fourier transform to obtain a time series signal $X_j(\omega, m)$ in the frequency domain where $\omega$ represents an angular frequency ($\omega=2\pi f$ where f represents a frequency) and m is a number representing time. Assuming that the source signal $s_i(t)$ (i=1, ..., I) is similarly transformed into time series signal $S_i(\omega, m)$ in the frequency domain, the observed signal $X_j(\omega, m)$ can be expressed as $$X_j(\omega, m) = \sum_{i=1}^{I} A_{ji}(\omega) S_i(\omega, m)$$

where $A_{ji}(\omega)$ represents a frequency response from the signal source of the signal $s_i$ to the sensor $1_j$. This can be expressed in terms of vectors and a matrix as follows:

$$X(\omega, m) = A(\omega) S(\omega, m) \quad (1)$$

where $$X(\omega, m) = [X_1(\omega, m), \ldots, X_J(\omega, m)]^T \quad (2)$$

$$S(\omega, m) = [S_1(\omega, m), \ldots, S_I(\omega, m)]^T \quad (3)$$

are vector representations of observed signals by J sensors and I source signals. $A(\omega)$ is a J×I matrix having a frequency response $A_{ji}(\omega)$ as elements, and is referred to as a mixture matrix since it represents the frequency response of a signal mixture system. Denotation $[a]^T$ represents the transposition of a vector or a matrix a.

In FIG. 1, a source signal which is oncoming in a direction $\theta_i$ reaches the sensor $1_j$ by $\tau_{ij}=c^{-1}d_j \cos \theta_i$ earlier relative to the sensor $1_1$ which is located at $d_1=0$ where c represents the velocity of the source signal $s_i$. Accordingly, when only the direct wave is considered, the frequency response at the angular frequency $\omega$ can be modeled as follows:

$$A_{ji}(\omega) = \exp(j\omega c^{-1} d_j \cos \theta_i) \quad (4)$$

Denoting the arrival direction vector which has the direction $\theta$ as follows:

$a(\omega, \theta) = [\exp(j\omega c^{-1} d_1 \cos \theta), \exp(j\omega c^{-1} d_2 \cos \theta), \ldots, \exp(j\omega c^{-1} d_J \cos \theta)]$, the observed signal can be expressed by an approximation $$X(\omega, m) = \sum_{i=1}^{I} a(\omega, \theta_i) S_i(\omega, m).$$

A method of estimating the direction of a signal source using the independent component analysis is described in S. Kurita, H. Saruwatari, S. Kajita, K. Takeda and F. Itakura, "Evaluation of blind signal separation method using directivity pattern under reverberant conditions", in Proc. ICASS2000, 2000, pp. 3140–3143 (referred to as literature 1), for example. This method will be briefly described below.

The observed signal $X(\omega, m)$ is equal to $A(\omega)S(\omega, m)$, indicating a mixture of the source signal $S(\omega, m)$, and thus is not mutually independent. When the independent component analysis is applied to $X(\omega, m)$, $$Y(\omega, m) = W(\omega) X(\omega, m) \quad (5)$$

there are obtained mutually independent separated signals $$Y(\omega, m) = [Y_1(\omega, m), \ldots, Y_I(\omega, m)]^T \quad (6)$$

$W(\omega)$ is an I×J matrix having elements $W_{ij}(\omega)$, and is referred to as a separation matrix. For example, when I=J=2, the independent component analysis seeks for the separation matrix $W(\omega)$ which satisfies $$\begin{bmatrix} Y_1(\omega, m) \\ Y_2(\omega, m) \end{bmatrix} = \begin{bmatrix} W_{11}(\omega) & W_{12}(\omega) \\ W_{21}(\omega) & W_{22}(\omega) \end{bmatrix} \cdot \begin{bmatrix} X_1(\omega, m) \\ X_2(\omega, m) \end{bmatrix}$$

so that $Y_1(\omega, m)$ and $Y_2(\omega, m)$ are independent from each other. When the source signals $S_1(\omega, m), \ldots, S_1(\omega, m)$ are independent from each other, it follows that the separated signals $Y_1(\omega, m), \ldots, Y_1(\omega, m)$ should correspond to some one of the source signals. However, it should be noted that the independent component analysis is based only on the independence of signals, and accordingly there remains arbitrariness as regards the sequence and the magnitude of the separated signals. In other words, if rows of the separation matrix $W(\omega)$ are interchanged or if rows of $W(\omega)$ are multiplied by a constant, they still remain to be solutions of the independent component analysis. As will be described later, the arbitrariness of the sequence leads to a permutation problem and the arbitrariness of the magnitude leads to a scaling problem.

Considering an i-th row of the separation matrix $W(\omega)$, which is $w_i(\omega)=[W_{ij}(\omega), \ldots, W_{i,l}(\omega)]$, it is seen that $w_i(\omega)$ creates the separated signal $Y_i(\omega, m)$. Accordingly, it follows that $w_i(\omega)$ designates one of the source signals $S_1(\omega, m), \ldots, S_1(\omega, m)$ by emphasis while suppressing others. By analyzing the directivity pattern formed by $w_i(\omega)$, an analysis can be made to see what is the direction in which the oncoming signal is extracted and what is the direction in which the oncoming signal is suppressed. Thus, this analysis can be relied upon to estimate the arrival direction of the source signal $s_i(t)$. When this process is repeated for every $w_i(\omega)$, $i=1, \ldots, I$, the arrival direction $\Theta=[\theta_1(\omega), \ldots, \theta^I(\omega)]^T$ of the source signal which is extracted by each of $w_i(\omega)$ in the separation matrix $W(\omega)$ can be estimated.

The directivity pattern defined by $w_i(\omega)$ can be expressed as $B_i(\omega, \theta)=w_i(\omega)a(\omega, \theta)$ using an arrival direction vector $a(\omega, \theta)$. $B_i(\omega, \theta)$ is considered as a frequency response from a source signal located in the direction $\theta$ to the separated signal $Y_i(\omega, \theta)$. The gain $|B_i(\omega, \theta)|$ of directivity patterns obtained by the independent component analysis at 3156 Hz is shown in FIG. 2 where the abscissa represents $\theta$ while the ordinate represents a gain. A curve shown in solid line represents the directivity pattern $|B_1(\omega, \theta)|$ given by the first row of the separation matrix, and the curve shown in broken lines represents the directivity pattern $|B_2(\omega, \theta)|$ given by the second row. It will be seen that the solid line curve has a minimum gain at 55° and the broken line curve has a minimum gain at 121°. It is apparent from this that the first row of the separation matrix extracts a signal oncoming from 121° while suppressing a signal oncoming from 55°, and the second row of the separation matrix extracts a signal oncoming from 55° while suppressing a signal oncoming from 121°. Accordingly, an estimation can be rendered that $\Theta(3156 \text{ Hz})=[121°, 55°]^T$.

MUSIC (Multiple Signal Classification) method (see S. Unnikrishna Pillai, "Array Signal Processing", Springer-Verlag, 1989, ISBN 0-387-96951-9, ISBN 3-540-96951-9, for example) is known as a method of estimating the directions of a plurality of signal sources using a plurality of sensors and transforming observed signals from the sensors in the frequency domain. With this method, the directions of signal sources up to (J−1) which is one less than the number J of the sensors can be estimated. By contrast, according to the method which incorporates the independent component analysis (such method is simply referred to as ICA method), two sensors can accommodate for a mixture of two signals, and thus this method is superior to MUSIC method in this respect. However, with this ICA method, accommodation for a mixture of three or more signals involves difficulties which will be described later. In addition, the determination of a minimum gain of the directivity pattern requires a high computational cost calculations.

The application of the ICA method for a mixture of three signals using three sensors will be described. In this instance, the ICA can take place in the similar manner as before with a 3×3 separation matrix, but the analysis of the gain of a directivity pattern involves difficulties. The gain $|B_i(\omega, \theta)|$ of the directivity pattern at the frequency of 2734 Hz subsequent to the ICA process is shown in FIG. 3. In FIG. 3, a solid line curve represents the directivity pattern given by the first row of the separation matrix, a broken line curve represents the directivity pattern given by the second row and a single dot chain line curve represents the directivity pattern given by the third row. In this instance, it is expected that each source signal would be emphasized by a certain row of the separation matrix and would be suppressed by the remaining two rows. However, it is not always assured that the two rows suppress the signal in the same direction. By way of example, referring to FIG. 3, it is seen that $|B_2|$ and $|B_3|$ both assume a minimum value around 45°, indicating that $w_1(\omega)$ extracts a source signal located around 45° while $w_2(\omega)$ and $w_3(\omega)$ suppress this source signal. In the similar manner, $|B_1|$ and $|B_3|$ both assume a minimum value around 90°, indicating that $w_2(\omega)$ extracts a source signal located around 90° while $w_1(\omega)$ and $w_3(\omega)$ suppress this signal. Nevertheless, while it appears that $w_3(\omega)$ extracts a source signal located around 120° while $w_1(\omega)$ and $w_2(\omega)$ suppress this source signal, it is seen that the minimum values of $|B_1|$ and $|B_2|$ around 120° are significantly different from each other. When the difference is increased in this manner, it becomes unclear to determine which suppression acting in either direction corresponds to which one of source signals. As a consequence, it is contemplated that the application of the prior art incorporating the ICA method to a situation involving three or more signals is difficult to achieve.

Blind Signal Separation

The prior art of blind signal separation utilizing the ICA will now be described. The blind signal separation represents a technology which estimates a source signal or signals from observed mixed signals. In the description to follow, an example will be dealt with in which a mixed signal comprising a mixture of I source signals is observed with J sensors.

Denoting a source signal generated by a signal source i by $s_i(t)$ (i=1, ..., I; t represents time) and a mixed signal observed by a sensor j by $x_j(t)$ (j=1, ..., J), the mixed signal $x_j(t)$ can be expressed as follows:

$$x_j(t) = \sum_{i=1}^{I} (a_{ji} * s_i)(t) \qquad (7)$$

where $a_{ji}$ represents an impulse response from the signal source i to the sensor j, and * a convolution operator. The purpose of the blind signal separation is to determine a filter $w_{kj}$ which is required for the separation and the separated signal $y_k(t)$ (k=1, ..., I) using only the observed signal $x_j(t)$ according to the following equation:

$$y_k(t) = \sum_{j=1}^{J} (w_{kj} * x_j)(t) \quad (8)$$

A convolutive mixture in the time domain can be transformed into a plurality of instantaneous mixtures in the frequency domain. Specifically, above equations (7) and (8) are represented by the equations (1) and (5), respectively, where $W(\omega)$ is a separation matrix which is calculated using ICA so that $Y_k(\omega, m)$ and $Y_k'(\omega, m)$ are mutually independent, and is a solution of the ICA.

What matters during the blind signal separation in the frequency domain relates to a permutation problem and a scaling problem.

As mentioned previously, an interchange of rows in the separation matrix $W(\omega)$ also results in a solution of the independent component analysis. Thus, assuming that $W(\omega)$ is a solution of the ICA at a certain angular frequency $\omega$, and denoting an arbitrary diagonal matrix by $D(\omega)$ and denoting an arbitrary permutation matrix (a multiplication of this matrix from the left of an arbitrary matrix results in a matrix which is obtained by the permutation of the rows of the arbitrary matrix) by $P(\omega)$, then $P(\omega)D(\omega)W(\omega)$ is also a solution of the ICA. This is because the ICA performs a separation of source signal based only on the statistical independence between the source signals. The freedom of a solution which is given by $D(\omega)$ is called a scaling ambiguity, and the freedom of a solution which is given by $P(\omega)$ is called a permutation ambiguity.

Accordingly, in order to perform an appropriate blind signal separation, a solution $W(\omega)$ must be identified which is appropriate to serve as a separation matrix from among the solutions of the ICA for all values of $\omega$. Generally, the identification of the appropriate solution $W(\omega)$ is made by multiplying a solution of the ICA which is arbitrarily obtained by an appropriate $D(\omega)$ or $P(\omega)$, with the result being chosen as an appropriate solution $W(\omega)$. Determining $D(\omega)$ in an appropriate manner for all values of $\omega$ is called a scaling problem, and determining $P(\omega)$ in an appropriate manner is called a permutation problem. Permutation refers to a bijection function $Z:\{1, 2, \ldots, I\} \to \{1, 2, \ldots, I\}$ from $\{1, 2, \ldots, I\}$ to $\{1, 2, \ldots, I\}$, and has a one-to-one correspondence to a permutation matrix.

The scaling freedom is equivalent to the freedom of a filter which changes a frequency response in the time domain. Accordingly, in order to produce distortion-free separated signals in the time domain, it is necessary to determine $D(\omega)$ in an appropriate manner for all values of $\omega$. This scaling problem can be readily solved by choosing $D(\omega) = \text{diag}(W^{-1}(\omega))$, for example. $\text{diag}(\alpha)$ represents a diagonalization of a matrix $\alpha$ (which is to make all elements other than diagonal elements to be 0). Thus, for a solution of the ICA which is arbitrarily obtained, $W_0(\omega)$, an inverse matrix is obtained, and it is diagonalized to provide a matrix $D(\omega)$, and $D(\omega) W_0(\omega)$ is identified as a appropriate separation matrix $W(\omega)$. This is already known in the art. For example, it is described in a reference literature: K. Matsuoka and S. Nakashima, "Minimal Distortion Principle of Blind Source Separation", Proc. ICA 2001, pp. 722–727.

On the other hand, because of the permutation ambiguity, it is possible that as a result of calculation according to the equation (5), a separated signal $Y_1(\omega, m)$ is delivered as an estimate for a source signal $S_1(\omega, m)$ at a certain angular frequency $\omega_1$ while the separated signal $Y_1(\omega_2, m)$ may be delivered as an estimate of a source signal $S_2$ ($\omega_2$, m) at another angular frequency $\omega_2$. In such instance, a component of a source signal $s_1(t)$ and a component of a source signal $s_2(t)$ in the time domain may be present in admixture in an output $y_1(t)$ in the time domain, preventing separated signals from being properly produced. Accordingly, in order for the output signal $y_1(t)$ in the time domain to properly be an estimate for the source signal $s_1(t)$, it is necessary that $P(\omega)$ be properly determined so that $Y_1(\omega, m)$ be an estimate of $S_1(\omega, m)$ for all values of $\omega$.

A method of estimating the arrival direction of a signal as disclosed in the cited literature 1 is known as a typical solution of the prior art for the permutation problem. Specifically, a directivity pattern corresponding to each row of the separation matrix $W(\omega)$ is determined at each frequency in a manner as described above with reference to FIG. 2 (in FIG. 2, the directivity pattern only for f=3156 Hz is shown). An arrangement is made such that in these directivity patterns at individual frequencies, the minimum gain of the directivity pattern given by the first row of the separation matrix $W(\omega)$ occurs at 55° and the minimum gain of the directivity pattern given by the second row occurs at 121°. Thus, if the minimum gain of the directivity pattern given by the first row of the separation matrix $W(\omega_n)$ at a certain angular frequency $\omega_n$ occurs at 121° and the minimum gain of the directivity characteristic given by the second row occurs at 55°, the first row and the second row of the separation matrix $W(\omega_n)$ are permuted. In other words, a permutation matrix $P(\omega_n)$ which performs such permutation is multiplied to the left of $W(\omega_n)$.

This method of solving the permutation problem requires a high computational cost in determining minimum gains of directivity patterns as mentioned previously, and in addition, where the number I of signal sources is equal to or greater than 3, a trial-and-error of appropriately rearranging $W(\omega)$'s for all frequencies is necessary. In addition, as described above with reference to FIG. 3, it is not assured that when a row of $W(\omega)$ extracts a signal $S_i(\omega, m)$ in a given direction, the remaining rows of the $W(\omega)$ are suppressing the signal $S_i(\omega, m)$ in that direction.

In addition, the accuracy of estimating the arrival direction of a signal by searching for a low gain of the directivity pattern depends on the position of the signal source. In particular, when the arrival direction of a signal is close to a straight line (hereafter referred to as a sensor pair axis) which joins a pair of sensors $\mathbf{1}_j$ and $\mathbf{1}_j'$, the magnitude of the error increases. This has been experimentally demonstrated. As shown in FIG. 4A, a pair of sensors 101 and 102, which are microphones, are spaced apart by a distance of 2.83 cm, and a pair of signal sources 111 and 112, which are sound sources, are disposed at a given distance (about 150 cm) from the midpoint (origin) between the sensors 101 and 102 and are angularly spaced apart by 20°. A direction of viewing the sensor 102 from the sensor 101 is chosen as a reference (0°), and the sound sources 111 and 112 are moved while maintaining above mentioned distance and the angular spacing so that the angle $\theta$ of the signal source 111 as viewed from the origin changes from 10° to 150°.

A blind signal separation which has been conducted while moving the sound sources 111 and 112 in this manner is illustrated in FIG. 4B where the ordinate represents a signal to interference ratio, and is calculated, using an target signal and an interference signal, as follows: $\text{SIR}=10 \log_{10}$ (power of target signal/power of interference signal)(dB). The abscissa of FIG. 4B represents the angle $\theta$ of the sound source 111 as viewed from the origin. A solid line graph shows a result of the experiment, and a broken line graph indicates SIR when a correct solution has been obtained for the permutation.

It is seen from FIG. 4B that when the signal source 111 approaches the sensor pair axis (which is 0° or 180°), SIR obtained by the experiment is greatly reduced as compared with SIR obtained for the correct solution of the permutation. It is believed that this is attributable to the fact that the permutation is in error as the direction of the signal source 111 moves close to the direction of the sensor pair axis.

The process of using the independent component analysis to determine a separation matrix, obtaining directivity characteristic pattern from each row of the separation matrix, searching for a direction of a low gain to determine the direction of a signal source (arrival signal direction) and utilizing it to effect the blind signal separation requires a large volume of calculation time in determining the directivity characteristic pattern and searching for a direction of a low gain.

It is an object of the present invention to provide an apparatus, a method and a program for estimation of positional information which allows a calculation time required in estimating positional information of signal sources to be reduced.

DISCLOSURE OF THE INVENTION

According to the present invention, inverse matrices (or pseudo-inverse matrices for I<J) for separation matrices $W(\omega_1), \ldots, W(\omega_N)$ in the frequency domain are calculated to produce estimates $H(\omega_1), \ldots, H(\omega_N)$ of mixed matrices $A(\omega_1), \ldots, A(\omega_N)$ up to the scaling and the permutation ambiguity. On the basis of the ratio between two elements $H_{ji}(\omega_n)$ and $H'_{j'i}(\omega_n)$ for each column of $H(\omega_n)(n=1, \ldots, N)$ for each frequency (where j and j' are parameters representing sensors and i is a parameter representing a signal source), one of parameters of positional information of a signal source i such as a conical surface or a curved surface on which the signal source exists, for example, is calculated.

What is required for the calculation is the calculation according to formulae which are expressed in terms of the ratio of elements in the matrix, and the amount of calculation can be reduced than when determining the directivity pattern of a separated signal and searching for a minimum location angle thereof. Using the ratio of elements avoids the influence of the scaling ambiguity.

BRIEF DESCRIPTION OF THE DRAWINGS

FIG. 11A graphically shows a result of an experiment of the estimation of a direction according to the first embodiment for a combination of two sound sources and three microphones;

FIG. 11B graphically shows a result of an experiment of the estimation of a direction according to the MUSIC method under the same condition as the experiment used for FIG. 11A;

FIG. 12 is a block diagram of a functional arrangement according to a second embodiment in which the present invention is applied to the blind signal separation;

FIG. 13 is a flow chart of an exemplary processing procedure used for the second embodiment;

FIG. 30A is a flow chart of an essential part of a processing procedure which is used in determining the direction of a straight line which is common to a plurality of conical surfaces to solve the permutation of a separation matrix;

FIG. 30B is a flow chart of an essential part of a processing procedure which is used to solve the permutation of a separation matrix by utilizing the estimation of a conical surface and the estimation of a spherical surface; and FIG. 30C is a flow chart of an essential part of another processing procedure which solves the permutation of a separation matrix by utilizing the estimation of a conical surface and the estimation of a spherical surface.

BEST MODES OF CARRYING OUT THE INVENTION

Figure 1:
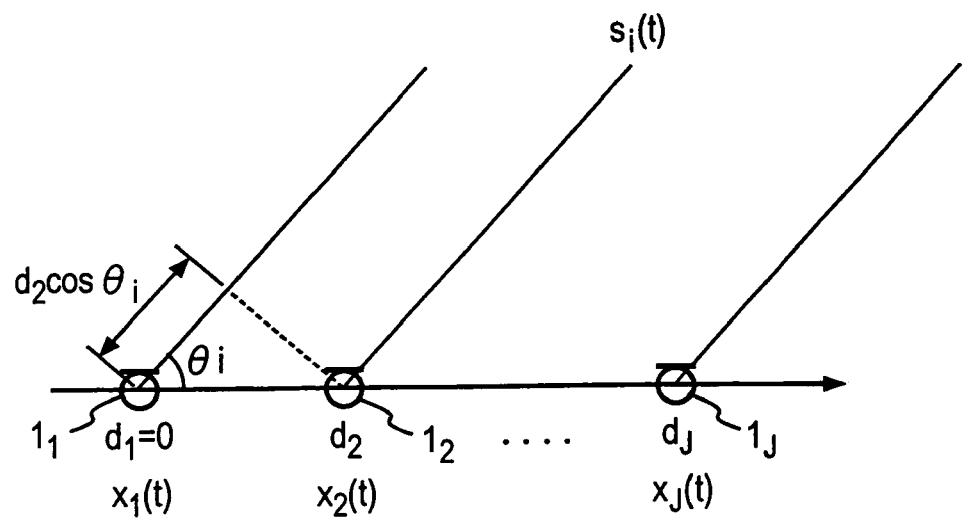
FIG. 1 is a diagram illustrating a relationship between a sensor array and differences in the arrival time of oncoming signals to individual sensors.
Figure 2:
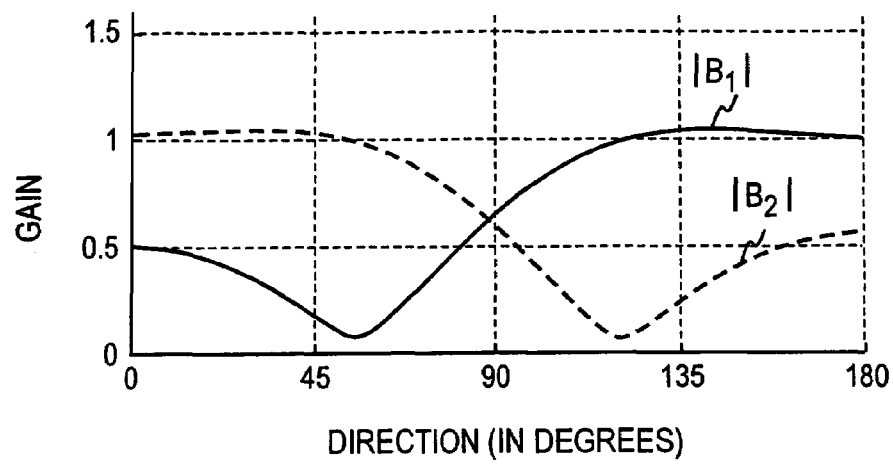
FIG. 2 graphically shows directivity patterns indicated by gains given by respective rows of a separation matrix which are calculated by the ICA process for a mixed signal from two sound sources.
Figure 3:
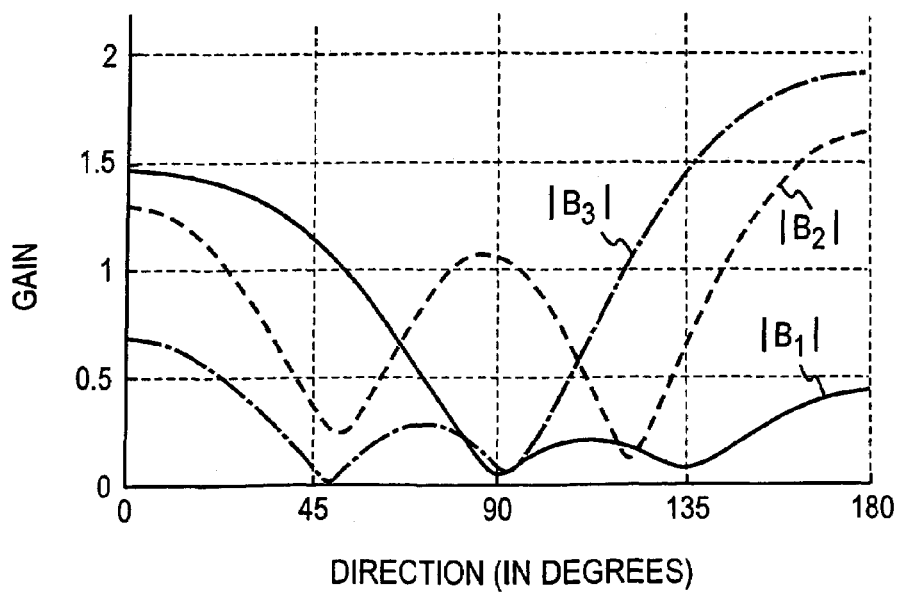
FIG. 3 graphically shows directivity patterns indicated by gains given by respective rows of a separation matrix calculated by the ICA process for a mixed signal from three sound sources.

An embodiment in which the present invention is applied in the estimation of direction information which represents positional information of a signal source will be described first. In the description to follow, identical or corresponding parts are designated by like reference numerals throughout the drawings in order to avoid a duplicate description.

First Embodiment

In this first embodiment, the direction of a signal source, or the arrival direction of a source signal which is radiated from the signal source is determined.

Figure 5:
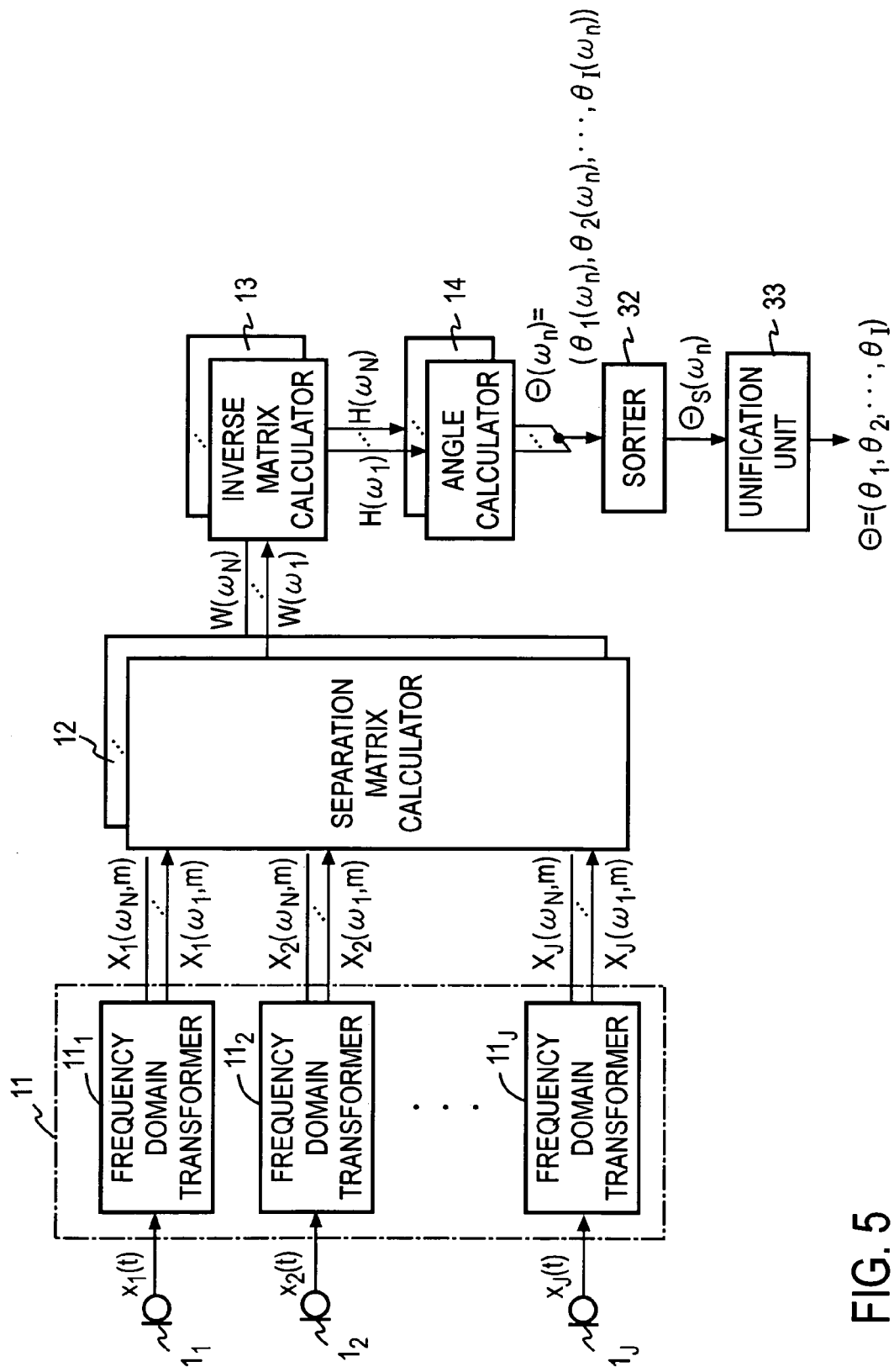
FIG. 5 is a block diagram showing an exemplary functional arrangement of a first embodiment in which the present invention is applied in the estimation of a signal arrival direction.
Figure 6:
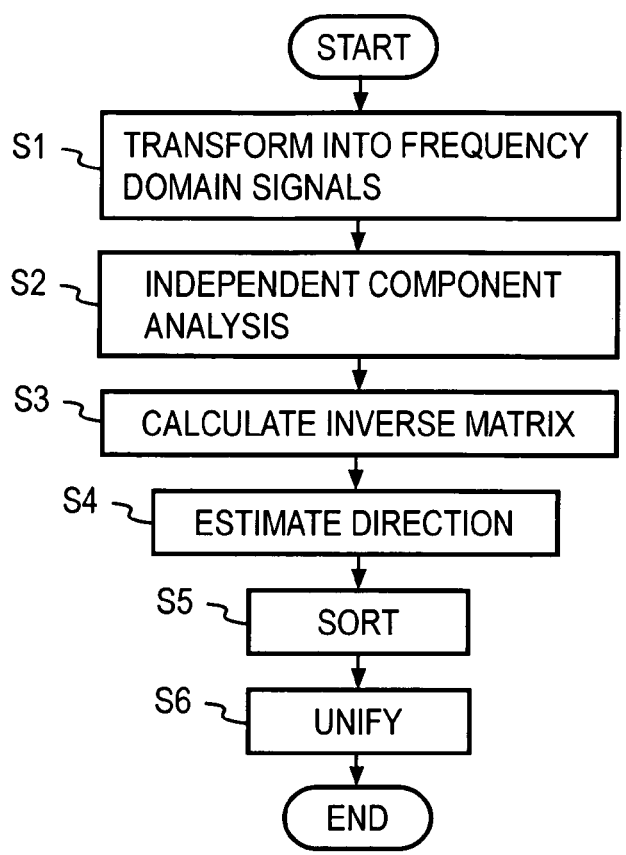
FIG. 6 is a flow chart of an exemplary processing procedure for the first embodiment.

FIG. 5 shows a functional arrangement of the first embodiment, and FIG. 6 shows a flow chart of part of a processing procedure therefor.

J sensors $1_1, 1_2, \ldots, 1_J$, which are equal to or greater in number than the number I of signal sources, are disposed in an array as shown in FIG. 1. A spacing between adjacent sensors is normally equal to or less than one-half the shortest wavelength of source signals. Signals $x_1(t)$ which are observed by the sensors $1_j$ (j=1, 2, . . . , J) are transformed into frequency domain signals $X_j(\omega, m)$ as by short-time Fourier transform in respective frequency domain transformers $11_j$ (step S1, FIG. 6). Separation matrices $W(\omega_n)$ (n=1, 2, . . . , N) for each angular frequency $\omega_n$ for these frequency domain signals $X_j(\omega, m)$ are calculated through the independent component analysis process in a separation matrix calculator 12 (step S2, FIG. 6).

$$W(\omega)=(W(\omega_1), W(\omega_2), \ldots, W(\omega_N))$$

An inverse matrix of the separation matrix $W(\omega_n)$ for each frequency is calculated in an inverse matrix calculator 13, thus determining an inverse matrix $H(\omega_n)$ (step S3, FIG. 6):

$$H(\omega)=(H(\omega_1), H(\omega_2), \ldots, H(\omega_N))$$

It is to be noted that the calculation of the inverse matrix is changed into the calculation of the pseudo-inverse matrix for J>I. The pseudo-inverse matrix may be the Moore-Penrose generalized inverse, for example.

In this embodiment, direction information, or specifically, the arrival direction of a source signal is calculated in an angle calculator 14 from the argument of the ratio of two elements $H_{ji}(\omega_n)$ and $H_{j'i}(\omega_n)$ of each column i of an inverse matrix $H(\omega_n)$ for at least one frequency (step S4, FIG. 6). A specific functional arrangement and an exemplary processing procedure for the angle calculator 14 will be described with reference to FIGS. 7 and 8. A selector 14a selects one column i in the inverse matrix $H(\omega_n)$ for the angular frequency $\omega_n$ which has not yet been selected (step S4A, FIG. 8) and two elements $H_{ji}(\omega_n)$ and $H_{j'i}(\omega_n)$ are selected from the i-th column (step S4B, FIG. 8).

Figure 8:
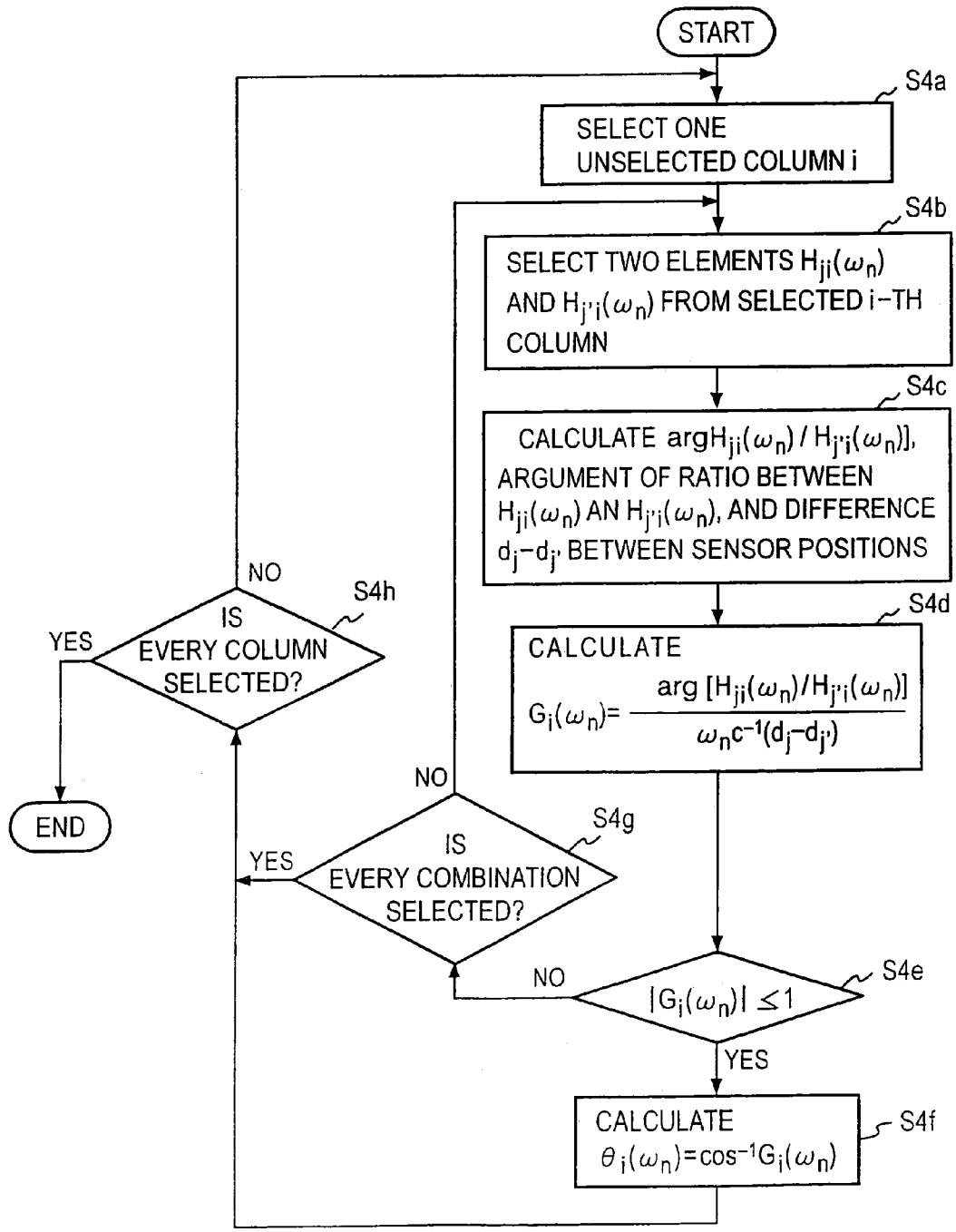
FIG. 8 is a flow chart of a specific example of step S4 shown in FIG. 6.

An argument calculator 14b calculates an argument of the ratio between the selected elements $G_i(\omega_n)=\arg[H_{ji}(\omega_n)/H_{j'i}(\omega_n)]$, and a spacing calculator 14c derives position information $d_j$ and $d_{j'}$ of sensors $1_j$ and $1_{j'}$ from a sensor information storage 15 to determine a spacing $d_j-d_{j'}$ between the sensors $1_j$ and $1_{j'}$ (step S4c, FIG. 8). A phase rotation calculator 14d calculates a product of the spacing $d_j-d_{j'}$ and a phase rotation $\omega_n/c$ (where c represents the velocity of the source signal) of the signal per unit distance at the angular frequency $\omega_n$ to determine the phase rotation of the signal over the spacing $d_j-d_{j'}$, and this quantity of phase rotation is used in a divider 14e to divide the arg $[H_{ji}(\omega_n)/H_{j'i}(\omega_n)]$ (step S4d, FIG. 8). It will be noted that the quantity of phase rotation $\omega_n/c$ per unit distance would be a phase rotation of $2\pi\cdot 2$ per 1 m for a sound wave (having a velocity c equal to 340 m/s) of f=680 Hz, for example.

A decision unit 14f determines whether or not a result of division $G_i(\omega_n)$ by the divider 14e has an absolute magnitude equal to or less than 1 (step S4e, FIG. 8). If the absolute magnitude is equal to or less than 1, the arccosine $\theta^i(\omega_n)$ =$\cos^{-1} G_i(\omega_n)$ of $G_i(\omega_n)$ is calculated in an arccosine calculator 14g (step S4f, FIG. 8). Thus, the following calculations are made in the angle calculator:

$$G_1(\omega_n)=\arg[H_{ji}(\omega_n)/H_{j'i}(\omega_n)]/(\omega(d_j-d_{j'})/c)\ \theta_i(\omega_n)$$
$$=\cos^{-1}G_i(\omega): \text{for } |G_i(\omega_n)|\leq 1 \quad (9)$$

Figure 7:
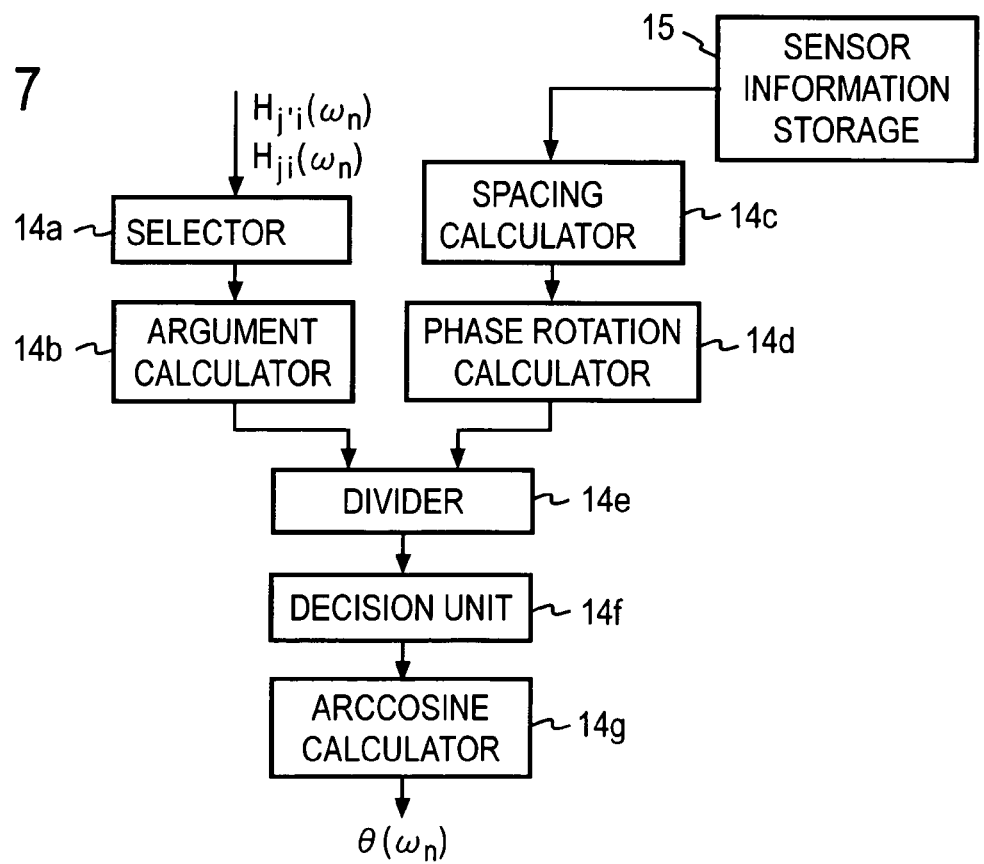
FIG. 7 is a block diagram of a specific example of an angle calculator shown in FIG. 5.

If $|G_i(\omega_n)|$ is not equal to or less than 1 at step S4e, the angle $\theta_i(\omega_n)$ would be an imaginary number, resulting in the selection of another combination. For this reason, a decision is rendered by the decision unit 14f to see if every combination of elements in the i-th column has been selected (step S4g, FIG. 8). If there remains any unselected combination, the operation returns to step S4b. On the other hand, when every combination has been selected, a decision is rendered by the decision unit 14f as to whether or not every column has been selected (step S4h, FIG. 8). If there remains any unselected column, the operation returns to step S4a. When every column has been selected, the processing operation of the angle calculation is completed. It should be noted that the spacing calculator 14c shown in FIG. 7 is used by the angle calculator 14 in common for every frequency.

A result of calculation of the equation (9), namely, the directions of I signal sources (signal arrival directions) $\Theta(\omega_n)=(\theta_1(\omega_n), \theta_2(\omega_n), \ldots, \theta_1(\omega_n))$ are delivered from the angle calculator 14 in a manner corresponding to each column of the inverse matrix $H(\omega_n)$ for the selected angular frequency $\omega_n$ in $H(\omega)$ in the sequence selected. Specifically, if the selection is sequentially made beginning with a first column, in that sequence. It will be seen that $\theta_1(\omega_n), \theta_2(\omega_n), \ldots, \theta_1(\omega_n)$ should correspond to either one of arrival directions of the source signals $s_1(t), s_2(t), \ldots, s_1(t)$ (the directions of the signal sources 1, 2, . . . , I).

A mechanism which is used in this embodiment to allow the estimation of signal arrival directions will now be described. If the separation were accomplished by the independent component analysis (ICA) process, it follows that the separation matrix $W(\omega)$ which is calculated by the ICA process and a true mixing matrix $A(\omega)$ is related such that $P(\omega)D(\omega)W(\omega)A(\omega)=I$ where $D(\omega)$ represents a diagonal matrix indicating the scaling ambiguity, $P(\omega)$ a permutation matrix indicating the permutation ambiguity and I a unit matrix. If the ICA process is used, the mixing matrix $A(\omega)$ itself cannot be generally calculated. However, when an inverse matrix of $W(\omega)$ or $H(\omega)=W^{-1}(\omega)=A(\omega)P(\omega)D(\omega)$ is calculated, an estimate of the mixed matrix containing the scaling ambiguity and the permutation ambiguity is obtained. Thus, the inverse matrix $H(\omega)$ comprises the mixed matrix $A(\omega)$, the columns of which are permutated according to $P(\omega)$ and are multiplied by the diagonal elements of $D(\omega)$.

In this embodiment, two elements $H_{ji}(\omega)$ and $H_{j'i}(\omega)$ are taken from the same column i of the inverse matrix $H(\omega)$, and the ratio $H_{ji}(\omega)/H_{j'i}(\omega)$ is determined to eliminate the scaling ambiguity which is caused by $D(\omega)$ which cannot be calculated. Thus $$\frac{H_{ji}(\omega)}{H_{j'i}(\omega)} = \frac{[A(\omega)P(\omega)D(\omega)]_{ji}}{[A(\omega)P(\omega)D(\omega)]_{j'i}} = \frac{A_{jZ(i)}(\omega)}{A_{j'Z(i)}(\omega)} \quad (21)$$

where Z represents a permutation which corresponds to the multiplication of the permutation matrix $P(\omega)$ from the right. When the calculation according to the equation (21) is made for every column i of the inverse matrix $H(\omega)$, the arrival directions of all signals can be estimated irrespective of the permutation Z by $P(\omega)$.

In the description of the background technique, an element of the mixed matrix $A(\omega)$ has been modeled as $A_{ji}(\omega)=\exp(j\omega c^{-1}d_j \cos\theta_i)$. However, such a simple model is insufficient for the purpose of the present embodiment because an estimate of the mixed matrix $A(\omega)$ up to the scaling ambiguity and the permutation ambiguity is calculated using the inverse matrix $H(\omega)$ of the separation matrix $W(\omega)$. Accordingly, using an amplitude attenuation factor $\alpha_{ji}$ (a real number) and a phase difference $\exp(j\phi_i)$ at the origin, a different model $A_{ji}(\omega)=\alpha_{ji}\exp(j\phi_i)\exp(j\omega c^{-1}d_j \cos\theta_i)$ is used. When $A_{jZ(i)}(\omega)/A_{j'Z(i)}(\omega)$ is calculated using this model, it follows from the equation (21):

$$\frac{H_{ji}(\omega)}{H_{j'i}(\omega)} = \frac{A_{jZ(i)}(\omega)}{A_{j'Z(i)}(\omega)} = \frac{\alpha_{jZ(i)}}{\alpha_{j'Z(i)}}\exp(j\omega c^{-1}(d_j-d_{j'})\cos\theta_{Z(i)}) \quad (22)$$

As a consequence, we have $$G_i(\omega)=\arg[H_{ji}(\omega)/H_{j'i}(\omega)]/(\omega c^{-1}(d_j-d_{j'}))=\cos\theta_{Z(i)}.$$

If $|G_i(\omega)|\leq 1$, $\theta_{Z(i)}=\cos^{-1}G_i(\omega)$ represents a real number, allowing an arrival direction to be estimated. All of I directions $\Theta(\omega)=[\theta_{Z(I)}(\omega), \ldots, \theta_{Z(1)}(\omega)]$ which are properly rearranged or permuted according to the permutation Z correspond to the directions of signals $s_1, \ldots, s_I$.

Alternatively, the angle $\theta_i(\omega_n)$ may be determined for each column and for each inverse matrix $H(\omega_n)$ (n=, ..., N) for a plurality of frequencies or every frequency in $H(\omega)$ in the manner mentioned above, and individual arrival directions may be determined on the basis of the whole assembly of these angles. Specifically, the arrival directions of individual frequencies which are estimated by the angle calculator 14 are sorted into different angles in a sorter 32 shown in FIG. 5 (step S5, FIG. 6). For example, these directions may be arranged in a descending order of the angle. Components of $\Theta(\omega_1)$ for the angular frequency $\omega_1$ may be arranged in an descending order ($\theta_1(\omega_1)$, $\theta_2(\omega_1)$, ..., $\theta_1(\omega_1)$); components of $\Theta(\omega_2)$ for the angular frequency $\omega_2$ may be arranged in an descending order ($\theta_1(\omega_2)$, $\theta_2(\omega_2)$, ..., $\theta_1(\omega_2)$) ... and components of $\Theta(\omega_1)$ for the angular frequency $\omega_N$ may be arranged in an descending order ($\theta_1(\omega_N)$, $\theta_2(\omega_N)$, ..., $\theta_1(\omega_N)$). When sorted in a descending order in this manner, the angles may vary from frequency to frequency even though they are similarly in a descending order. In other words, angles $\theta_i(\omega_1)$, $\theta_i(\omega_2)$, ..., $\theta_i(\omega_N)$ (i=1, ..., I) are dispersive.

Accordingly, the sorted angles $\theta_i(\omega_1)$, $\theta_i(\omega_2)$, ..., $\theta_i(\omega_N)$ are unified into a single angle $\theta_i$ in a unification unit 33 and this angle $\theta_i$ is deemed as an arrival direction (step S6, FIG. 6). For purpose of unification, a mean value of the sorted angles ($\theta_i(\omega_1)$, $\theta_i(\omega_2)$, ..., $\theta_i(\omega_N)$) may be chosen as a unified angle $\theta_i$ or a value having a highest frequency or a medium value among the sorted angles ($\theta_i(\omega_1)$, $\theta_i(\omega_2)$, ..., $\theta_i(\omega_N)$) may be chosen as a unified angle $\theta_i$. When the sorted angles are unified into a single angle, it is possible to estimate an arrival direction more correctly than when the arrival direction is estimated only on the basis of the inverse matrix $H(\omega_n)$ of a single frequency.

In the calculation and the estimation of the angle shown in FIG. 8, if the determination of the angle $\theta_i(\omega_n)$ fails even for one selected column, the processing operation with respect to that inverse matrix $H(\omega_n)$ is terminated at that point, and the processing operation transfers to the inverse matrix $H(\omega_n)$ of a different frequency. If the calculation of the angle (direction) has been successfully completed for every column during an initial try, the result of that calculation may be chosen as estimated (direction) $\theta_1, \ldots, \theta_i$. Alternatively, of all inverse matrices $H(\omega_n)$ for respective frequencies, result of the angle calculations which could have been successfully made for every column may be sorted and unified. As a further alternative, if a failure of calculating the angle $\theta_i(\omega_n)$ occurs for one column, subsequent processing operations may be terminated at the first time such failure has happened, and the processing operation may be restarted with the determination of observed signals in order to enhance the reliability of estimated results.

Figure 9:
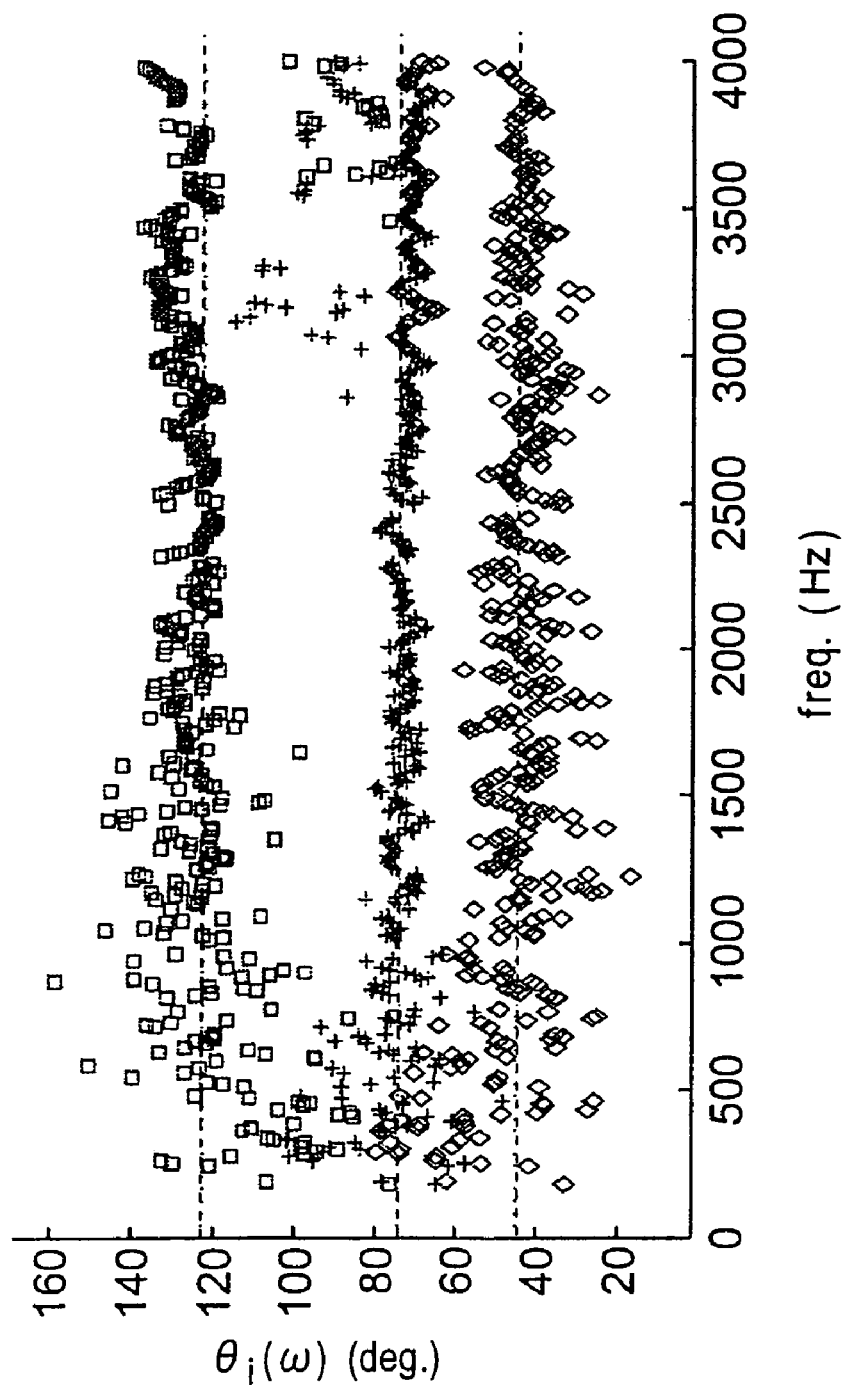
FIG. 9 graphically shows a result of an experiment which is conducted according to the first embodiment to estimate the direction.

An experimental example of the first embodiment will now be described. Three microphones are arrayed in one row at a spacing of 56.6 mm in a room having a reverberation time of 190 ms, and three sound sources are disposed at angles of 48°, 73° and 119° as referenced to the direction of the array. Acoustical signals from the sound sources are mixed together for six seconds, and observed signals are sampled with a sampling frequency of 8 kHz and with a maximum frequency of 3 kHz below which a spatial aliasing is prevented together with a short-time Fourier transform frame of 1024 samples. Angles calculated for each frequency are shown in FIG. 9 where the abscissa represents a frequency and the ordinate a direction. In FIG. 9, ◇, +, □ indicate calculated estimate values for the directions of three sound sources. When the result obtained is sorted into three ranges of angle, mean values of the sorted angles are 45°, 74° and 123°. While MUSIC method cannot estimate the directions of three sound sources with three microphones, it will be seen that the directions of the sound sources are estimated to a fairly good accuracy with this embodiment.

Figure 10A:
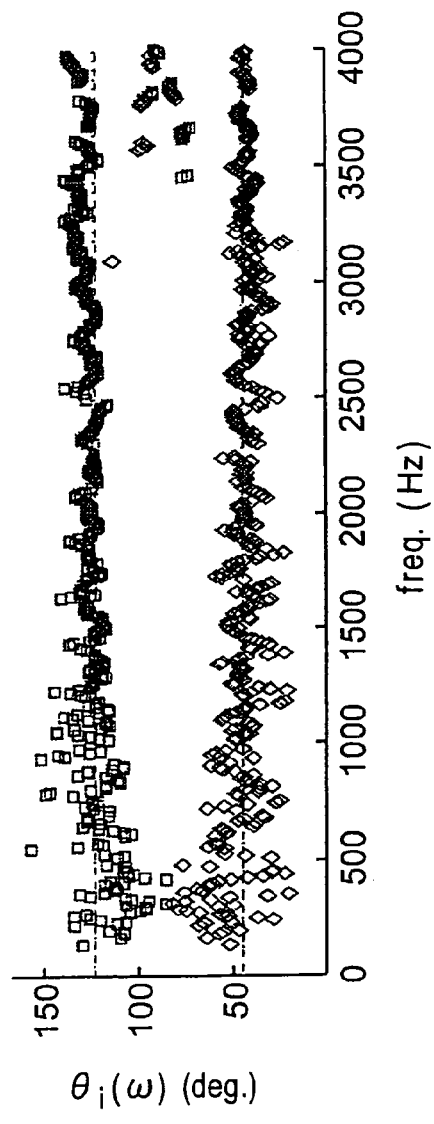
FIG. 10A graphically shows a result of an experiment of the estimation of a direction according to the first embodiment for a combination of two sound sources and three microphones.
Figure 10B:
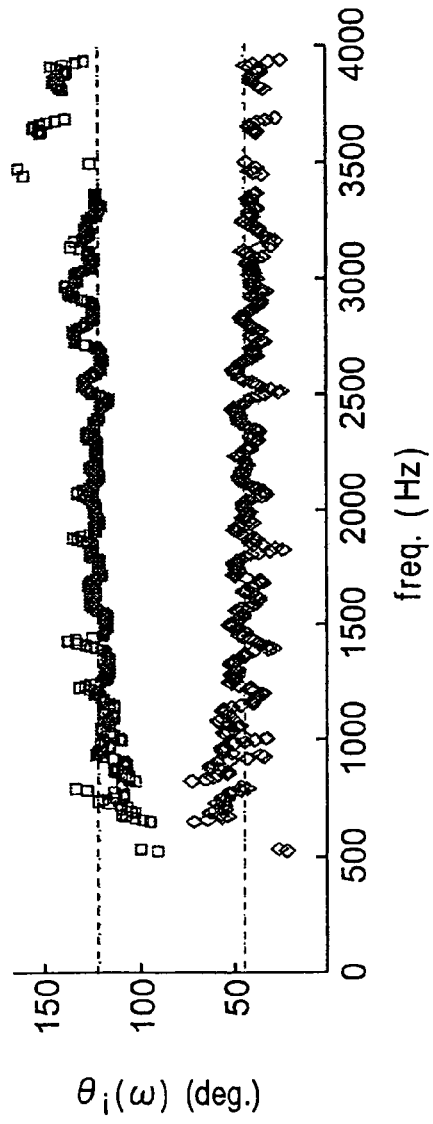
FIG. 10B graphically shows a result of an experiment in which the estimation of a direction is made according to the MUSIC method under the same condition as the experiment used for FIG. 10A.

To compare the method of this embodiment against MUSIC method, a similar experiment has been conducted by placing two sound sources which have directions of sound sources at 48° and 119°, thus a relatively large angular offset therebetween. A result obtained with the method of the present embodiment is shown in FIG. 10A while a result obtained with MUSIC method is shown in FIG. 10B. It will be seen that either method has estimated the directions with a fairly good accuracy. When the result according to the present embodiment is sorted into two ranges of directions, consequent mean angles are 45° and 123° while corresponding mean values according to MUSIC method are 45° and 122°, respectively. A similar experiment has been repeated when two sound sources are angularly close together having directions at 105° and 119°. Results obtained according to the method of the embodiment and results obtained according to MUSIC method are shown in FIGS. 11A and 11B, respectively. The estimation of direction of sound sources cannot be made with MUSIC method for most frequencies, but the calculation of angles are possible according to the embodiment for a majority of frequencies. In addition, when the angles obtained are sorted into ranges, the mean values in the respective ranges are equal to 105° and 124°, which it will be seen are much more correct than corresponding mean values according to MUSIC method which are 94° and 128°.

As discussed above, according to the present embodiment, a substitution of values into the equation (9) allows estimated directions to be determined, and accordingly, a computational time according to the embodiment are much less than a conventional method which searches for a direction where the gain of a directivity pattern is low. The separation matrix $W(\omega)$ which is obtained by the ICA process contains the scaling freedom and the permutation freedom as mentioned previously, and accordingly, it may be contemplated to calculate an inverse matrix of a separation matrix $W'(\omega)$ in which the problem of the freedom is solved, or to calculate a true mixed matrix $A(\omega)$, and to estimate an arrival direction on the basis of a ratio of two elements for each column of the mixed matrix $A(\omega)$. However, the true mixed matrix $A(\omega)$ itself cannot be determined without the use of a restriction that the average power of a signal $s_i(t)$ of a signal source is chosen to be 1, for example. The use of such a restriction upon a signal source may be possible in the radio communication field, but where the signal $s_i(t)$ of a signal source is a voice signal which is directly uttered by a man, a restriction of the kind described cannot be used. On the other hand, according to the first embodiment, the problem of the scaling freedom is solved by forming the ratio of two elements for each column of the inverse matrix $H(\omega)$ of the separation matrix $W(\omega)$ which contains the scaling and the permutation ambiguity, and such approach is applicable to any signal source. In addition, this avoids the need of calculating a separation matrix in which the both problems are solved, thus reducing the calculation time. In addition, once estimated directions which are obtained for individual frequencies are sorted in a predetermined sequence, the permutation problem can also be solved in a simple manner. If the number of signal sources is equal to the number of sensors J, the directions of each signal source can be estimated. If the directions of certain sound sources are located relatively close to each other, an estimation can be made with a fairly good accuracy.

Second Embodiment

A second embodiment is directed to obtaining direction information which is one item of positional information of signal sources. According to the second embodiment, at least three sensors which are disposed in at least two dimensions are used to allow a direction of a signal source to be estimated wherever the signal source is directed, thus allowing the permutation problem involved with the blind signal separation to be solved in a relatively simple manner. Specifically, a conical surface which is based on direction information is estimated, and a straight line which is in common to a plurality of conical surfaces is estimated to determine direction information.

A functional arrangement of the second embodiment as applied to the blind signal separation system is shown in FIG. 12, and a processing procedure used therein is shown in FIG. 13. By way of example, four sensors $1_1$, $1_2$, $1_3$ and $1_4$ are disposed on a circle at an equal interval, which is chosen to be equal to or less than one-half the minimum wavelength of source signals. In the description to follow, the number of sensors is assumed to be J where $J \geq 3$. In the similar manner as in the first embodiment, an observed signal $x_j(t)$ observed by each sensor j (j=1, . . . , J) is transformed into a signal $X_j(\omega_n)$ in the frequency domain in a frequency domain transformer 11 which may comprise a short-time Fourier transform, for example (step S11).

A separation matrix calculator 12 calculates by the independent component analysis a separation matrix for each frequency:

$$W(\omega) = \begin{bmatrix} W_{11}(\omega) & \cdots & W_{1J}(\omega) \\ \vdots & \vdots & \vdots \\ W_{IJ}(\omega) & \cdots & W_{IJ}(\omega) \end{bmatrix}$$

from the signal $X_j(\omega_n)$ in the frequency domain (step S12).

An inverse matrix calculator 13 calculates an inverse matrix $H(\omega)$ for each separation matrix $W(\omega)$ for each frequency (step S13):

$$H(\omega) = \begin{bmatrix} H_{11}(\omega) & \cdots & H_{1J}(\omega) \\ \vdots & \vdots & \vdots \\ H_{JI}(\omega) & \cdots & H_{JI}(\omega) \end{bmatrix}$$

In the second embodiment, a conical surface estimator 14 estimates conical surfaces on which some signal source would be present on the basis of ratios of elements for a plurality of element pairs, for each column of an inverse matrix $H(\omega)$ for each frequency. Each conical surface has a center axis defined by a sensor pair axis joining two sensors which correspond to the elements. In this manner, a plurality of conical surfaces, each corresponding to each column of one mixing matrix $H(\omega)$, are estimated (step S14).

Figure 14:
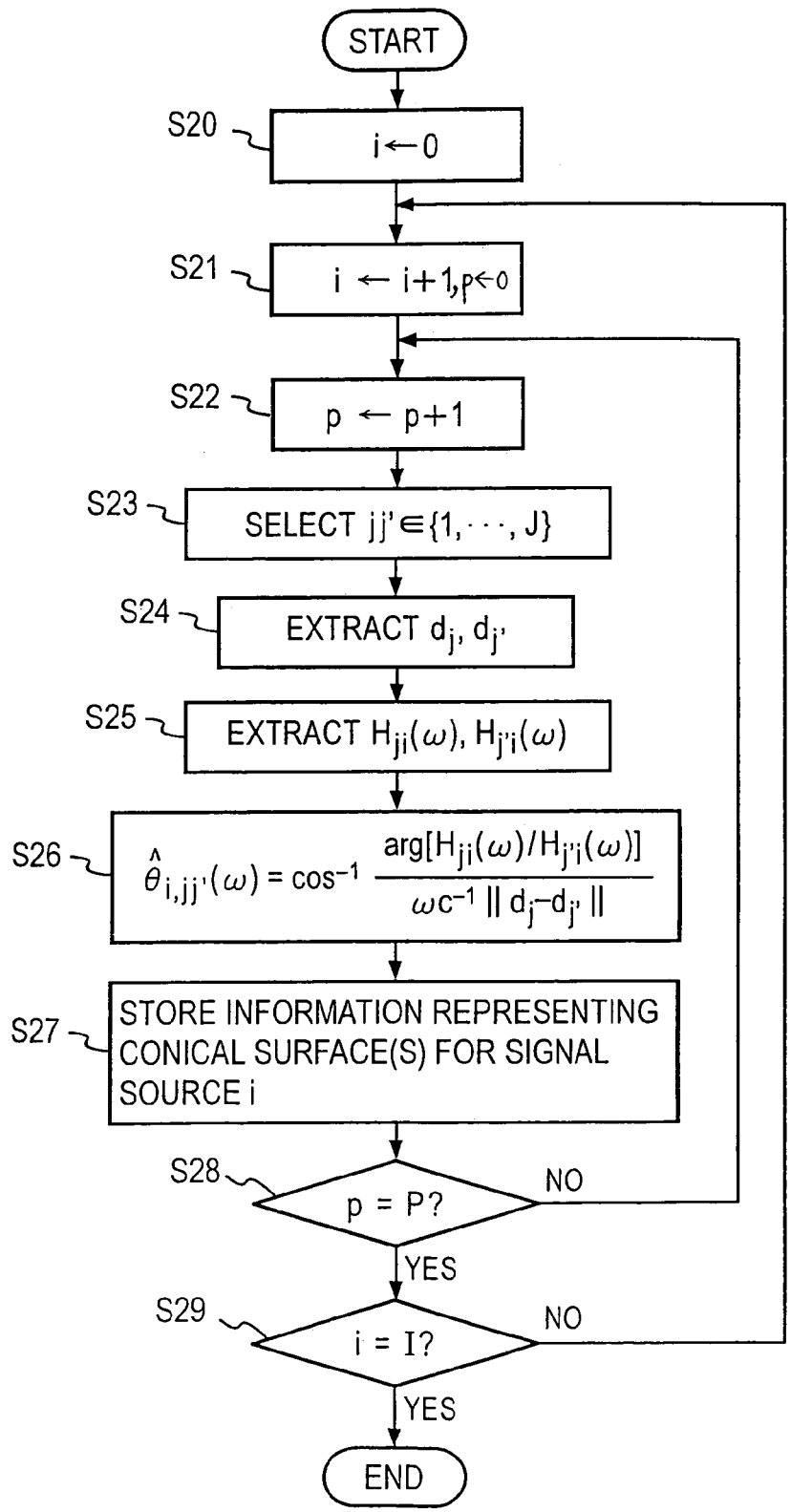
FIG. 14 is a flow chart of a specific example of the processing procedure used at step S14 shown in FIG. 13.

The functional arrangement of the conical surface estimator 14 is substantially similar to the angle calculator 14 shown in FIG. 5, and a processing procedure used for the conical surface estimator is similar to the procedure shown in FIG. 8. A specific example of a processing operation at step S14 which takes place within the conical surface estimator 14 for an inverse matrix $H(\omega)$ for a certain frequency will be described with reference to FIG. 14.

Initially, control parameters i which is stored in a register within the conical surface estimator 14 is initialized (step S20) where i corresponds to the number of each signal source.

i is incremented by one and control parameter p is stored in a register within the number of conical surface estimator 14 is intialized where p represents the number of conical surfaces which have been estimated for each value of I (step S21), P is incremented by one (step S22), and control parameters j, j' which are mutually different natural numbers (j≠j') equal to or less than J are selected at random, for example (step S23). The pair of control parameters j, j' which is once selected is not selected again for the same value of i. For example, if (j, j')=(1, 2) is selected once for i=1, (j, j')=(1, 2) is not selected again at step S23 until the end of the processing operation for i=1. (It is desirable that this selection be made such that a sensor pair axis, namely a straight line passing through sensors j and j' which are specified by the selected j and j' is not aligned with a sensor pair axis specified by j, j' which were previously selected during this routine. It then follows that the conical surface estimator 14 will estimate a plurality of conical surfaces having center axes which do not overlap within a given range of errors. Whether or not several sensor pair axes are aligned can be determined, for example, by storing vectors which indicate the positions of sensors in a sensor information storage 15, and by retrieving information representing the vectors which indicate the positions of the sensors.)

A vector $d_j$ indicating the position of a j-th sensor j which corresponds to the parameter j selected at S23 and a vector $d_{j'}$ indicating the position of a j'-th sensor j' corresponding to the parameter j' are retrieved from the sensor information storage 15 (step S24). A j-row i-column element $H_{ji}(\omega)$ and a j'-row and an i-column element $H_{j'i}(\omega)$ are designated to be retrieved (step S25). These operations are performed by the selector 14a shown in FIG. 7. Accordingly, it should be understood that the selector 14a include register which store i, p, j, j' designated.

Using retrieved information, a calculation is made according to the following equation: (step S26)

$$\hat{\theta}_{i,jj'} = \cos^{-1} \frac{\arg[H_{ji}(\omega)/H_{j'i}(\omega)]}{\omega c^{-1} \|d_j - d_{j'}\|} \quad (9')$$

where $\|d_j - d_{j'}\|$ represents a spacing or distance between sensors $1_j$ and $1_{j'}$. In the second embodiment, a plurality of sensors are disposed in two or three dimensions. Accordingly, positional information of individual sensors are represented by two or three element coordinate vector having an origin at the center of a circle on which sensors $1_1$ to $1_4$ are disposed. It will be recalled that the equation (9) is developed for a two-dimensional angle indicating an arrival direction of a signal when sensors are disposed as a linear array, but the equation (9') is an extension of the equation (9) in that the sensors may be disposed in two or three dimensions and angles indicating arrival directions of signals may be in a three-dimensional space. Accordingly, it is to be understood that the equation (9') comprehends the equation (9). The angle $\hat{\theta}_{i,jj'}$ which is estimated according to the equation (9') and associated parameters i, j and j' are temporarily stored in registers (memory) within the conical surface estimator 14 as a conical surface information (step S27). As indicated in broken lines in FIG. 12a, a spacing calculator 14c for each frequency is used in common. The angle $\theta_i(\omega)$ which is calculated according to the equation (9) is estimating a set of innumerable straight lines in the three dimensional space for which the angle for the sensor pair axis (a straight line joining sensors $1_j$ and $1_{j'}$) is equal to $\theta_i(\omega)$ or the presence of a signal source i on the conical surface. A result of calculation of the extended equation (9') is represented as $\hat{\theta}_{i,jj'}(\omega)$ rather than $\theta_i(\omega)$. Calculations which take place at step S26 are made at the steps S4c, S4d, S4e and S4f in FIG. 8 by using the argument calculator 14b, the spacing calculator 14c, the phase rotation calculator 14d, the divider 14e, the decision unit 14f and the arccosine calculator 14g shown in FIG. 7.

A decision is made to see if p=P (step S28). P is the number of conical surfaces which are to be estimated for each value of i, and this step decides whether or not P conical surfaces have been estimated for the particular i. If p is not equal to P, the operation returns to step S22, and if p=P, a decision is made to see if i=I (step S29). Thus, a decision is made to see if the estimation of conical surfaces have been completed for all values of i. If i is not equal to I, the operation returns to step S21, but if i=I, the processing operation is completed (this completes the description of a specific example of step S14). In the first embodiment, when one value of the angle $\theta_i(\omega)$ is estimated for a particular value of i, the operation transfers to the estimation of the angle for next value of i. However, in the second embodiment, the plurality of angles (conical surfaces) $\hat{\theta}_{i,jj'}(\omega)$ are estimated for each value of i. The operations of steps S28 and S29 are performed by the decision unit 14f.

An arrival direction decision unit 16 shown in FIG. 12 determines arrival directions $u_i(\omega)$=(azmuth $\theta_i(\omega)$) and an angle of elevation $\phi_i(\omega)$) (i=1, ..., I) of source signals on the basis of information concerning a plurality of conical surfaces which are estimated in the conical surface estimator 14 (which are i, j, j', $\hat{\theta}_{i,jj'}(\omega)$)(i=1, ..., I) step S15, FIG. 12). Specifically, to give an example, a plurality of conical surfaces which are estimated for a particular value of i may be in line contact with each other to produce a common straight line, the direction of which is regarded as an arrival direction $u_i(\omega)$ of a signal corresponding to a signal source i.

Figure 15:
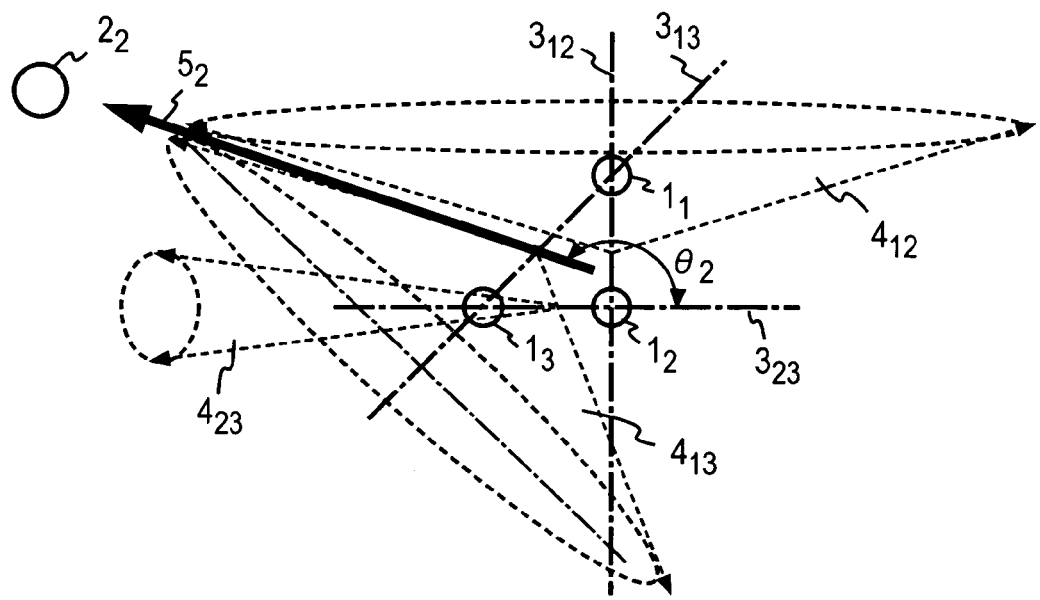
FIG. 15 is a diagram illustrating the direction of a straight line which is common to a plurality of conical surfaces.

A method of estimating an arrival direction $u_i(\omega)$ of a signal will now be described with reference to FIG. 15. A sensor $1_3$ is disposed in a direction perpendicular to the direction of an array formed by sensors $1_1$ and $1_2$, and it is assumed that the spacing between the sensors $1_1$ and $1_2$ and the spacing between the sensors $1_2$ and $1_3$ are equal. For a signal source $2_2$ which represents i=2, the combination of $1_1$ and $1_2$ estimates a conical surface $4_{12}$ ($\hat{\theta}_{2,12}(\omega)$) which has a sensor pair axis $3_{12}$ as a center axis, the combination of the sensors $1_2$ and $1_3$ estimates a conical surface of $4_{23}$ ($\hat{\theta}_{2,23}(\omega)$) which has a sensor pair axis $3_{23}$ as a center axis, and the combination of the sensors $1_1$ and $1_3$ estimates a conical surface $4_{13}$ ($\hat{\theta}_{2,13}(\omega)$) which has a sensor pair axis $3_{13}$ as a center axis. Of these conical surfaces, the conical surfaces $4_{12}$ and $4_{13}$ are regarded as being in line contact with each other at a common straight line $5_2$. The direction $u_2(\omega)$ of the common straight line $5_2$ is regarded as an arrival direction $u_2$ of a signal which is radiated from the signal source $2_2$ or the direction of the signal source $2_2$. While the conical surface $4_{23}$ would be in substantially line contact with the conical surfaces $4_{12}$ and $4_{13}$ when it is subject to a translation, it is discarded according to a fourth embodiment to be described later.

A specific example of the method of determining the direction $\theta_i(\omega)$ of the common straight line $5_i$ which takes place in the arrival direction decision unit 16 shown in FIG. 12 will now be described. A plurality of conical surfaces which are estimated for the presence of a signal source $2_i$ at an angular frequency $\omega$ are denoted by $4_{jj'}(1), ..., 4_{jj'}(P)$, positional information for a pair of sensors which are used in the estimation of the conical surfaces $4_{jj'}(p)$ (p=1, ..., P) is denoted by $d_j(p)$ and $d_{j'}(p)$, an angle which corresponds to a conical surface $4_{jj'}(p)$ which is estimated for the angular frequency $\omega$ is denoted by $\hat{\theta}_{jj'}(\omega, p)$ and a vector representing a conical surface $4_{jj'}(p)$ is denoted by u.

A normalized axis vector calculator 16a normalizes an axis vector $(d_j(p)-d_{j'}(p))$ which joins the pair of sensor positions to a length of 1. In other words $$v_p = (d_j(p)-d_{j'}(p))/\|d_j(p)-d_{j'}(p)\|$$

is calculated. An inner product of $v_p$ and a conical surface vector is supposed to be a cosine of an angle formed between these vectors. Thus, $$v_p^T \cdot u/\|u\| = \cos \hat{\theta}_{jj'}(\omega, p)$$

applies. Since what we want to know is only the direction of the common straight line $5_i$, the conical surface vector u is represented by a unit vector, or $\|u\|=1$. To determine the direction of a straight line which is in common with all conical surfaces, denoting $$V=(v_1 \ldots v_P)^T, \hat{c}(\omega)=(\cos \hat{\theta}_{jj'}(\omega, 1) \ldots \cos \hat{\theta}_{jj'}(\omega, P))^T$$

the following simultaneous equations may be solved for u.

$$Vu = \hat{c}(\omega) \ (\|u\|=1)$$

A solution for the simultaneous equations generally does not exist or cannot be determined uniquely. Accordingly, u which minimizes $\|Vu-\hat{c}(\omega)\|$ is then determined and is made to be a solution of the simultaneous equations or the direction $u_i(\omega)$ of the common straight line $5_i$. A calculation for determining u which minimizes this error is performed in a calculator 16b. Since the direction $u_i(\omega)$ represents a direction in three dimensions, it follows that the direction is given in polar coordinates in terms of the azimuth $\theta_i(\omega)$ and the angle of elevation $\phi_i(\omega)$.

Figure 16:
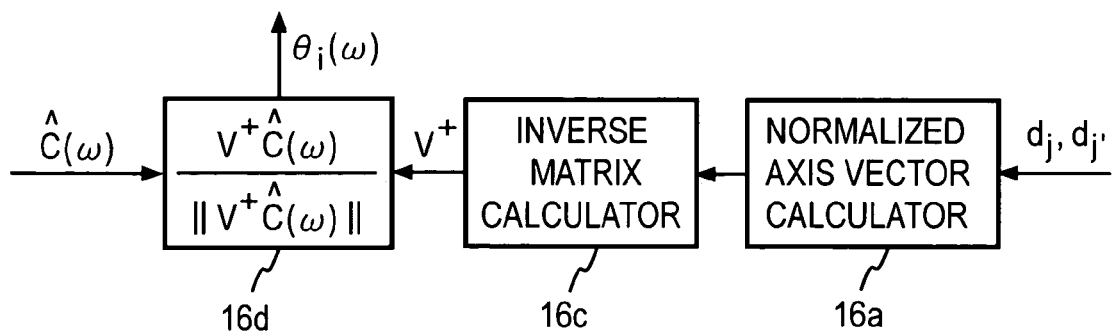
FIG. 16 is a block diagram of another example of an arrival direction decision unit 16 shown in FIG. 12.

The following approach may be used to simplify the calculation. As shown in FIG. 16, a normalized axis vector $v_p (p=1, \ldots, P)$ for each sensor pair which is used in the estimation of a conical surface in the normalized axis vector calculator 16a is determined, Moore-Penrose type general inverse matrix $V^+$ for $V=(v_1, \ldots, v_P)^T$ is calculated in an inverse matrix calculator 16c, and using $V^+$ and a cosine vector $\hat{c}(\omega)=(\cos \hat{\theta}_{jj'}(\omega, 1) \ldots \cos \hat{\theta}_{jj'}(\omega, P))^T$, a solution which is of a minimum norm type or which achieves least square error is determined and the magnitude is normalized to provide an approximate solution. In other words, $$u_i(\omega)=V^+\hat{c}(\omega)/\|V^+\hat{c}(\omega)\|$$

is calculated in a calculator 16d.

In this manner, the direction of a straight line which is regarded as being common to a plurality of estimated conical surfaces is determined for each frequency and for each signal source.

A permutation solver 17 shown in FIG. 12 performs a permutation of rows in the separation matrix $W(\omega)$ which is calculated in the separation matrix calculator 12 using the arrival direction $u_i=(\theta_i, \phi_i)$ which is determined by the arrival direction decision unit 16, thus producing a separation matrix for which the permutation problem has been solved.

To give a specific example of what is performed by the permutation solver 17, a permutation is performed in accordance with an arrival azimuth angle $\theta_i$ in a manner to be described below, and for a column or columns for which the problem could not have been solved, a permutation is performed in accordance with an arrival angle of elevation $\phi_i$ in a similar manner. Specifically, a permutated matrix in which columns in the inverse matrix $H(\omega)$ are permuted so that arrival azimuth angles $(\theta_i, \omega)$ which have been calculated and determined assume a given sequence, for example, an ascending order of $\theta_1, \theta_2, \ldots, 74_1$ for any frequency and so that angles of elevation $\phi_i$ are similarly in an ascending order for those columns for which the permutation failed is produced in a permuted matrix generator 17a. An inverse matrix $P(\omega)$ of the permuted matrix is produced in an inverse matrix generator 17b. In a permutater 17c, the inverse matrix $P(\omega)$ is multiplied to the separation matrix $W(\omega)$ from the left. The permuted matrix generator and the inverse matrix generator 17b form together a permutation matrix generator.

A processing operation which takes place in the permuted matrix generator 17a will be specifically described. In this example, it is assumed that $(\theta_1(\omega), \phi_i(\omega))$ is calculated for a first column of the inverse matrix $H(\omega)$, $(\theta_2(\omega), \phi_2(\omega))$ is calculated for a second column ... and $(\theta_1(\omega), \phi_1(\omega))$ is calculated for the I-th column in accordance with the equation (9'). Arrival directions which are input from the arrival direction decision unit 61 are denoted by $\theta$ and $\phi$ having suffices with primes "'" or as $(\theta_1'(\omega), \phi_1'(\omega)), (\theta_2'(\omega), \phi_2'(\omega)), \ldots, (\theta_1'(\omega), \phi_1'(\omega))$ in order to discriminate them angles which are permuted in the ascending order and they are arranged in an ascending order of $\theta_i(\omega)$, for example. If the result is such that $(\theta_3'(\omega), \phi_3'(\omega))>(\theta_1'(\omega), \phi_1'(\omega))>(\theta_2'(\omega), \phi_2'(\omega))>\ldots$, a movement takes place so that the third column of the inverse matrix $H(\omega)$ assumes the first column, the first column assumes the second column and the second column assumes the third column together with a similar movement of remaining columns. For columns which assumes an identical value of $\theta_i(\omega)$, columns are moved so that $\phi_i(\omega)$ assume an ascending order. A permuted matrix which moves or permutates columns in this manner is produced. Producing a matrix which performs such a permutation is known in the art. A permuted matrix is produced using arrival directions $(\theta_1(\omega), \phi_1(\omega)) \ldots (\theta_1(\omega), \phi_2(\omega))$ which are obtained for every frequency, and an inverse matrix thereof or a permutation matrix $P(\omega)$ is calculated (step S16, FIG. 13).

The permutation matrix $P(\omega)$ which is calculated in this manner is multiplied to the separation matrix $W(\omega)$ from the left in a permuter unit (17c), and a resulting matrix $W'(\omega) = P(\omega)W(\omega)$ is delivered as a separation matrix for which the permutation problem has been solved (step S17). Thus, for any frequency, in the separation matrix $W'(\omega)$, the first row contains elements which separate a signal from signal source $2_1$, the second row contains elements which separate a signal from signal source $2_2$, and similarly elements in a common row are elements which separate signals from a same signal source.

The separation matrix $W'(\omega)$ is transformed in a time domain transformer 18, by an inverse Fourier transform, for example, into a time domain separation coefficient bank $$\begin{matrix} w_{11} & \ldots & w_{1J} \\ \vdots & \vdots & \vdots \\ w_{II} & \ldots & w_{IJ} \end{matrix}$$

which is set up in a signal separator 19.

The signal separator 19 performs the calculation according to the equation (8) using observed signals $x_1(t), \ldots, x_J(t)$ from the sensors and the separation filter coefficient bank to deliver separated signals $y_1(t), \ldots, y_I(t)$.

As indicated in broken lines in FIG. 12, the calculation according to the equation (5) takes place in a frequency domain separated signal generator 19' using the permuted separation matrix $W'(\omega)$ from the permutation solver 17 and the frequency domain observed signal $X(\omega, m)$ from the frequency domain transformer 11, and a resulting frequency domain separated signal $Y(\omega m)=W'(\omega)X(\omega, m)$ may be applied to a time domain signal transformer 18' to generate time domain signals $y_1(t), \ldots, y_1(t)$. Alternatively, arrival directions $(\theta_1(\omega), \phi_1(\omega)), \ldots, (\theta_1(\omega), \phi_1(\omega))$ for each frequency which are determined by the arrival direction decision unit 16 may be sorted into ranges of directions in the similar manner as in the first embodiment, namely, in the sorter 32 shown in FIG. 5, and arrival directions over the entire frequency for each sorted range may be unified in the unification unit 33.

As described above, in this embodiment again, the calculation according to the equation (9') estimates conical surface information $(\hat{\theta}_{jj}(\omega), \hat{\phi}_{jj}(\omega))$ without searching for a direction of a low gain in the directivity pattern, and accordingly, the amount of calculation is reduced. In addition, because a plurality of a conical surfaces are estimated for a single signal source, and the arrival direction of the signal is determined on the basis of a common straight line therebetween, it is possible to estimate the direction of a signal source 3; uniquely irrespective of wherever the signal source is located in a range from 0° to 360°. The estimated direction is utilized in the determination of the permutation matrix $P(\omega)$, and accordingly, the permutation problem can be properly solved irrespective of locations of signal sources.

Third Embodiment

In a third embodiment, a curved surface on which a signal source exists is used as positional information which is based on the ratio of distances between a pair of sensors and a single signal source. In the first and the second embodiment, an assumption is made that signal sources are located remotely from sensors, and accordingly, signals from the signal sources are oncoming as plane waves to the sensors. However, when distances between signal sources and sensors are relatively short, a signal is oncoming as a spherical wave to a sensor. In view of this, when a ratio $A_{ji}(\omega)/A_{j'i}(\omega)$ of elements of a mixing matrix $A(\omega)$ is interpreted according to a spherical wave (close distance field) model, information other than the direction of a signal source i can be estimated.

Specifically, using a close distance field model, a frequency response $A_{ji}(\omega)$ can be expressed as follows:

$$A_{ji}(\omega)=(1/\|q_i-d_j\|)\exp(j\omega c^{-1}(\|q_i-d_j\|))$$

where $q_i$ is a vector indicating the position of a signal source i.

A ratio of two elements in a common column of a mixing matrix, $A_{ji}(\omega)/A_{j'i}(\omega)$, is formed using the frequency response expressed in the manner mentioned above, and the absolute magnitude of the ratio is calculated as follows:

$$\|q_i-d_j\|/\|q_i-d_j\|=|A_{ji}(\omega)/A_{j'i}(\omega)| \quad (10)$$

where $|\beta|$ represents the absolute magnitude of $\beta$.

A set of innumerable number of points $q_i$ which satisfy the equation (10) defines a curved surface on which a signal source i exists, and allows a distance from a sensor to the signal source i to be estimated when used in combination with a direction (or a conical surface) which is estimated using a far distance field (plane wave model). Accordingly, if two or more signal sources are located in a same direction or mutually adjacent directions, if there is a difference in the distance, they can be discriminated, allowing the permutation problem to be properly solved.

In the third embodiment illustrated here, positional information representing a curved surface on which a signal source exists and the direction information which is treated above are used in solving the permutation problem of a separation matrix.

Figure 17:
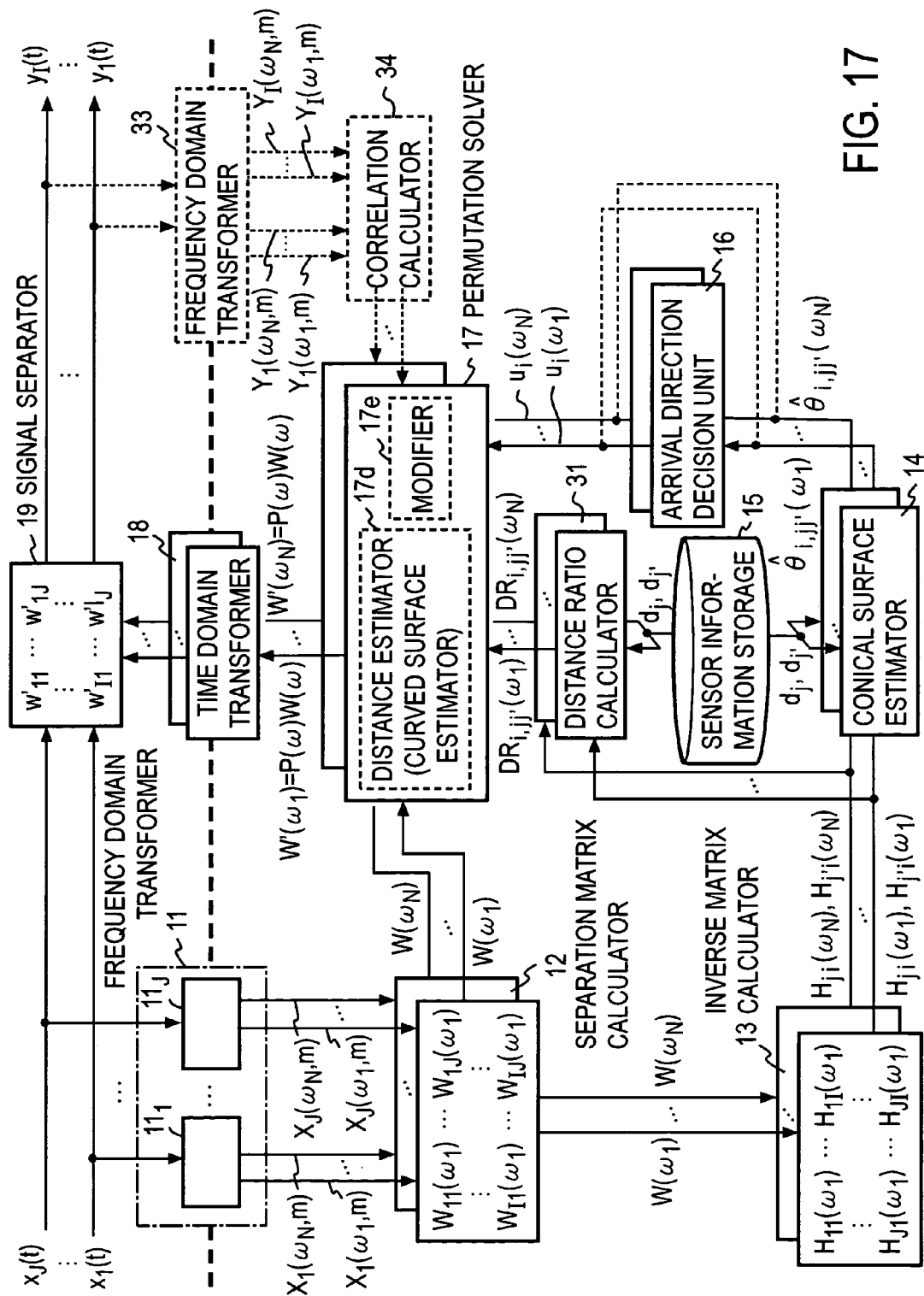
FIG. 17 is a block diagram of a functional arrangement of a third embodiment in which the present invention is applied to the blind signal separation.
Figure 18:
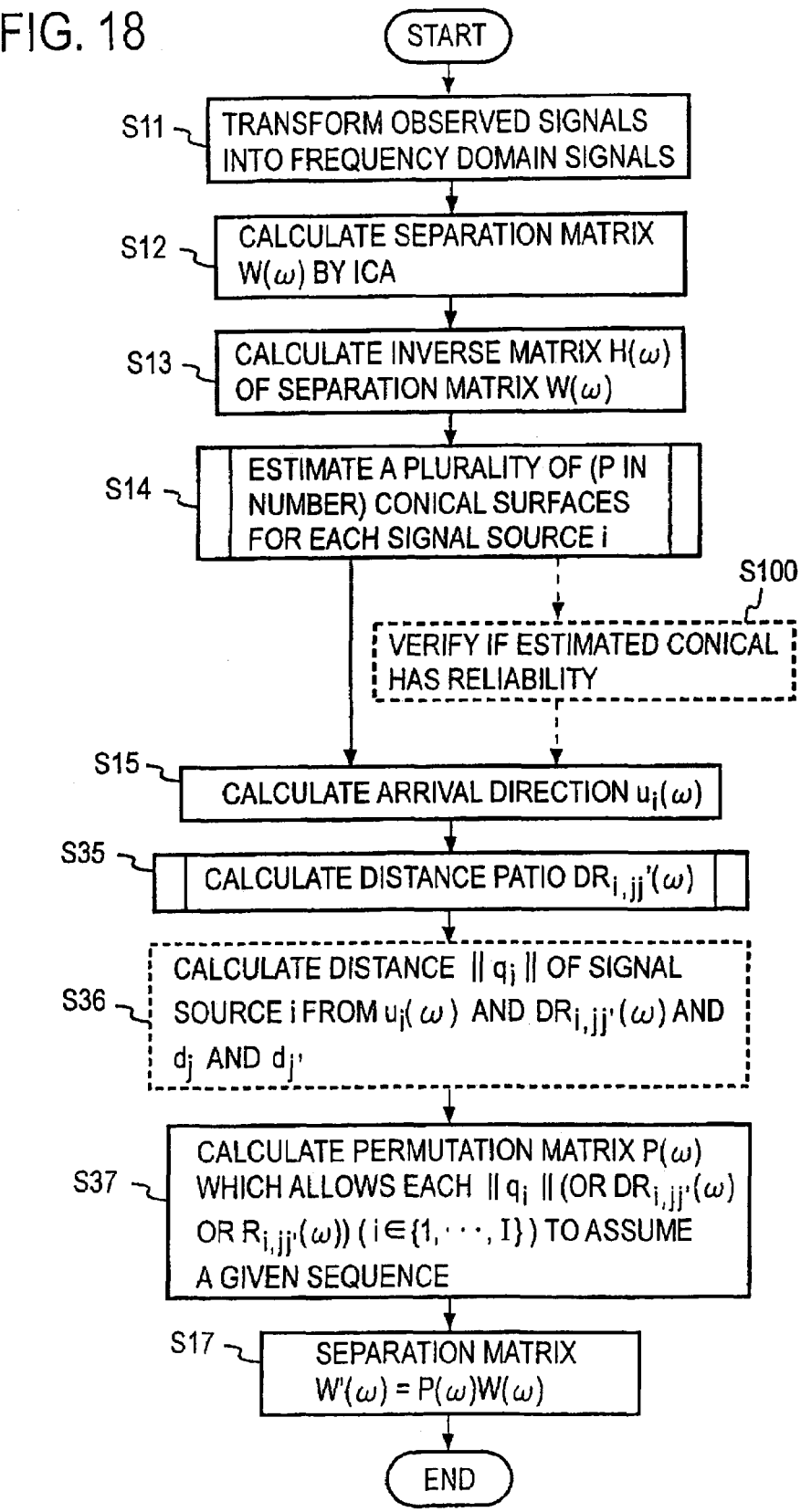
FIG. 18 is a flow chart of an exemplary processing procedure used for the third embodiment.
Figure 20:
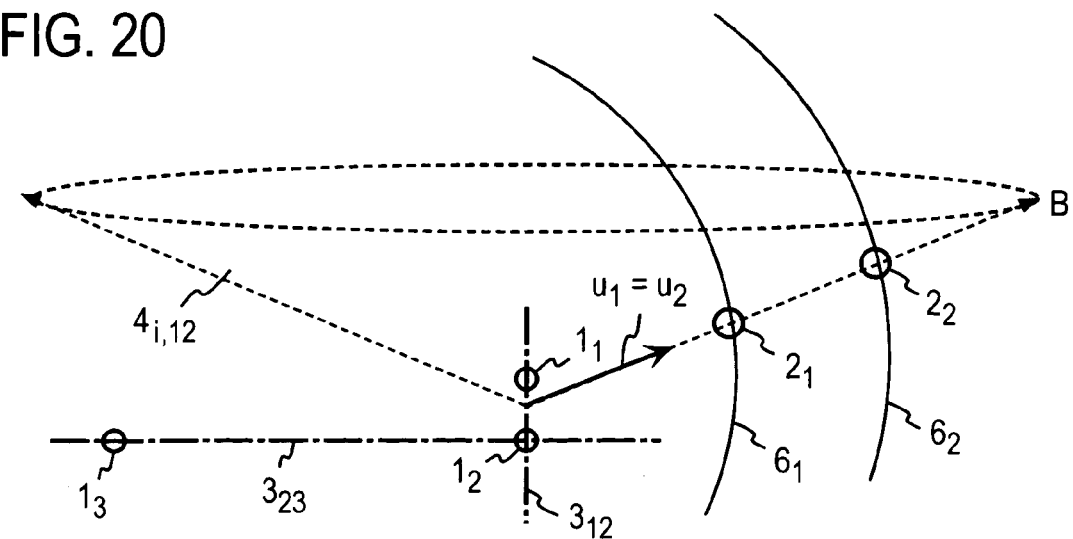
FIG. 20 is a diagram illustrating a relationship between the disposition of sensors, positions of signal sources and an estimated curved surface.

A functional arrangement of the third embodiment is shown in FIG. 17 and a processing procedure is shown in FIG. 18. Three or more sensors are disposed in two or three dimensions, but in this embodiment, a spacing between sensors $1_2$ and $1_3$ is chosen ten to twenty times, preferably on the order of fifteen times, the spacing between sensors $1_1$ and $1_2$ as illustrated in FIG. 20, for example. In the similar manner as in the preceding embodiments, observed signals $x_1(t), \ldots, x_J(t)$ are transformed into frequency domain signals $X_1(\omega, m), \ldots, X_J(\omega, m)$ (step S11). Subsequently, the independent component analysis process is used to calculate a separation matrix $W(\omega)$ for each frequency (step S12), and a matrix $H(\omega)$ which is an inverse matrix of the separation matrix $W(\omega)$ is calculated (step S13). In the example shown, a pair of elements selected from each column of the inverse matrix $H(\omega)$ for each frequency are used to estimate one or preferably a plurality of conical surfaces, in the similar manner as in the second embodiment (step S14). In the third embodiment, a distance ratio calculator 31 calculates a ratio of distances between a corresponding sensor and a single signal source i using the pair of elements selected for each column of the inverse matrix $H(\omega)$ for each frequency, thus using the equations (10) and (21) to derive the following equation (10') (step S35):

$$\|q_{z(i)}-d_j\|/\|q_{z(i)}-d_{j'}\|=|A_{jz(i)}(\omega)/A_{j'z(i)}(\omega)|=|H_{ji}(\omega)/H_{j'i}(\omega)|$$
$$=DR_{i,jj'}, \quad (10')$$

Figure 19:
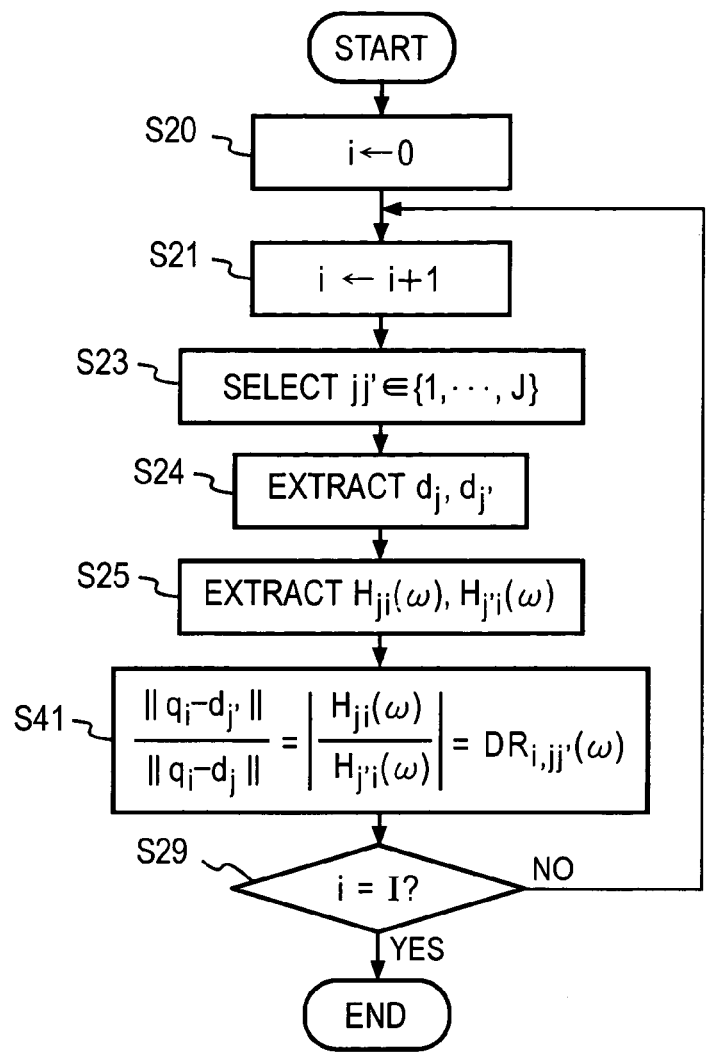
FIG. 19 is a flow chart of a specific example of step S35 shown in FIG. 18.

A specific example of steps 35 which takes place in the distance ratio calculator 31 will be described with reference to FIG. 19. This processing operation is substantially similar to the processing operation shown in FIG. 14. Parameter i is initialized to 0 (step S20) and is then incremented by one (step S21), and natural numbers which are equal to or less than J are selected as parameters j, j'(j≠j'), at random, for example, and a pair which is once selected is not selected again (step S23). Position vector $d_j$ of a sensor j and position vector j' of a sensor j' are retrieved (step S24) and elements $H_{ji}(\omega)$ and $H_{j'i}(\omega)$ are selected from an i-th column of an inverse matrix $H(\omega)$ (step S25).

In this embodiment, a ratio $DR_{i,jj'}(\omega)$ of the selected two elements is calculated (step S41). A decision is then rendered to see if i=I (step S29), and unless i=I, the operation returns to step S21, but if i=I, the processing operation is completed.

Distance ratio information $DR_{i,jj'}(\omega)$ which is calculated by the distance ratio calculator 31 is fed to a permutation solver 17, which uses direction information $u_i(\omega)$ which is estimated in the arrival direction decision unit 16 and the distance ratio information $DR_{i,jj'}(\omega)$ calculated by the distance ratio calculator 31 to solve the permutation problem for the separation matrix which is calculated by separation matrix calculator 12.

The permutation problem is solved by performing a permutation of rows in $W(\omega)$. For example, using direction information and distance ratio information, the distance $\|q_i(\omega)\|$ of a signal source $2_i$ is calculated by a distance estimator 17d (step S36).

A method of calculating the distance $\|q_i(\omega)\|$ will be described with reference to FIG. 20. Signal sources $2_1$ and $2_2$ lie in a same direction B as viewed from the sensors $1_1$ and $1_2$. In this instance, the sensors $1_1$ and $1_2$ and the directions $u_1$ and $u_2$ of signal sources $2_1$ and $2_2$ which are estimated according to the far distance field model define a same straight line. On the other hand, if a signal source $2_1$ exists, a curved surface $6_1$ can be estimated using largely spaced sensors $1_2$ and $1_3$ and the near distance field model, from the distance ratio $$DR_{1,23}(\omega)=|H_{21}(\omega)/H_{31}(\omega)|=\|q_1-d_3\|/\|q_1-d_2\|.$$

In this manner, $\|q_1(\omega)\|$ can be estimated. If a signal source $2_2$ exists, a curved surface $6_2$ on which the signal source $2_2$ exists can be estimated from a distance ratio $$DR_{2,23}(\omega)=|H_{22}(\omega)/H_{32}(\omega)|=\|q_2-d_3\|/\|q_2-d_2\|.$$

Thus $\|q_2(\omega)\|$ can be estimated.

The position of the signal source $2_1$ can be estimated as existing on a common area between the straight line $u_1=u_2$ and the curved surface $6_1$, and the position of the signal source $2_2$ can be estimated as existing on a common area on the straight line $u_1=u_2$ and a curved surface $6_2$. For example, an equation representing the straight line $u_1=u_2$ and equations which represent the curved surfaces $6_1$ and $6_2$ may be used as simultaneous equations, which can be solved to determine $\|q_1(\omega)\|$ and $\|q_2(\omega)\|$. In this manner, if the directions of signal sources are same or closely related, it is possible to discriminate the positions of the signal sources.

The permutation solver 17 performs a permutation of rows in the separation matrix $W(\omega)$ so that the distances of signal sources $\|q_i(\omega)\|$ for each frequency which are obtained in the manner mentioned above are in a given sequence, for example, in an ascending order. At this end, a permutation matrix $P(\omega)$ is calculated (step S37). The permutation matrix $P(\omega)$ can be calculated in the similar manner as the permutation matrix is calculated by the permutation solver in the second embodiment. The calculated permutation matrix $P(\omega)$ is multiplied to the separation matrix $W(\omega)$ from the left, and a resulting matrix $W'(\omega)=P(\omega)W(\omega)$ is delivered as a separation matrix (step S17).

The delivered separation matrix $W'(\omega)$ is fed to a time domain transformer 18 where it is used for purpose of signal separation.

As will be understood from FIG. 20, considering the sensors $1_2$ and $1_3$, there is a large difference between the distance between the signal source $2_1$ and the sensor $1_2$ and the distance between the signal source $2_1$ and the sensor $1_3$ while a difference between the distance between the signal source $2_2$ and the sensor $1_2$ and the distance between the signal source $2_2$ and the sensor $1_3$ is small. Accordingly, a difference between $DR_{1,23}=\|q_1-d_3\|/\|q_1-d_2\|$ and a numerical FIG. 1 has a relatively large absolute magnitude while a difference between $DR_{2,23}=\|q_2-d_3\|/\|q_2-d_2\|$ and a numerical FIG. 1 has a small absolute magnitude. The greater the spacing between the sensors $1_2$ and $1_3$, the greater the difference between the distance ratios $DR_{1,23}(\omega)$ and $DR_{2,23}(\omega)$. A sensor pair which has a large spacing therebetween, which are $1_2$ and $1_3$ in this example, are used at this end.

In the permutation solver 17, a permuted matrix in which the distance ratio $DR_{i,jj'}(\omega)$ determined are in an ascending order in the sequence of the first column, the second column, the third column, . . . , and the I-th column of the inverse matrix $H(\omega)$ for each frequency may be produced using the calculated distance ratio $DR_{i,jj'}(\omega)$, as indicated at step S37 in FIG. 8, and the permutation matrix $P(\omega)$ may be produced. In this instance, the distance estimator 17d shown in FIG. 17 is omitted. The distance ratio $DR_{i,jj'}(\omega)$ may be calculated where direction information $u_i(\omega)$ cannot be calculated in the arrival direction decision unit 16 or only for the signal source i and sensors ij' for which $u_i(\omega)$ of an equal value has been calculated for a plurality of columns of the inverse matrix $H(\omega)$, and this alone or in combination with $\|q_i(\omega)\|$ which is further determined may be used to permutate rows in the separation matrix $W(\omega)$. Specifically, direction information $u_i(\omega)$ may be used to permutate rows in the separation matrix $W(\omega)$, and subsequently, a permutation of rows of $W(\omega)$ may be further performed using the distance ratio $DR_{i,jj'}(\omega)$ or $\|q_i(\omega)\|$ for rows for which a permutation by using $u_i(\omega)$ could not have been successfully made. In practice, a permutation matrix $P(\omega)$ which produces the both permutations simultaneously is produced.

The distance ratio $DR_{i,jj'}(\omega)$ is determined initially, a permutation of rows in the separation matrix $W(\omega)$ is then performed on the basis of a result determined and where the distance ratio $DR_{i,jj'}(\omega)$ could not have been determined, a permutation of the separation matrix $W(\omega)$ can be continued by using direction information $u_i(\omega)$. Again, a permutation matrix $P(\omega)$ which performs both permutations simultaneously is produced. Generally, $u_i(\omega)$ can be utilized with a higher accuracy than with $DR_{i,jj'}(\omega)$, and accordingly, it is preferred that the permutation according to $u_i(\omega)$ is principally made, and where it is impossible, a permutation in accordance with $DR_{i,jj'}(\omega)$ is performed.

When the right side of the equation (10') is denoted by the distance ratio $DR_{i,jj'}(\omega)$ and the equation is solved for $q_i$, there is obtained a spherical surface having a center $O_{i,jj'}(\omega)$ and a radius $R_{i,jj'}(\omega)$ which are given by the following equations (11) and (12):

$$O_{i,jj'}(\omega))=d_{j'}-(d_{j'}-d_j)/(DR^2_{i,jj'}(\omega)-1) \qquad (11)$$

$$R_{i,jj'}(\omega)=\|DR_{i,jj'}(\omega)\cdot(d_{j'}-d_j)/(DR^2_{i,jj'}(\omega)-1)\| \qquad (12)$$

Figure 21:
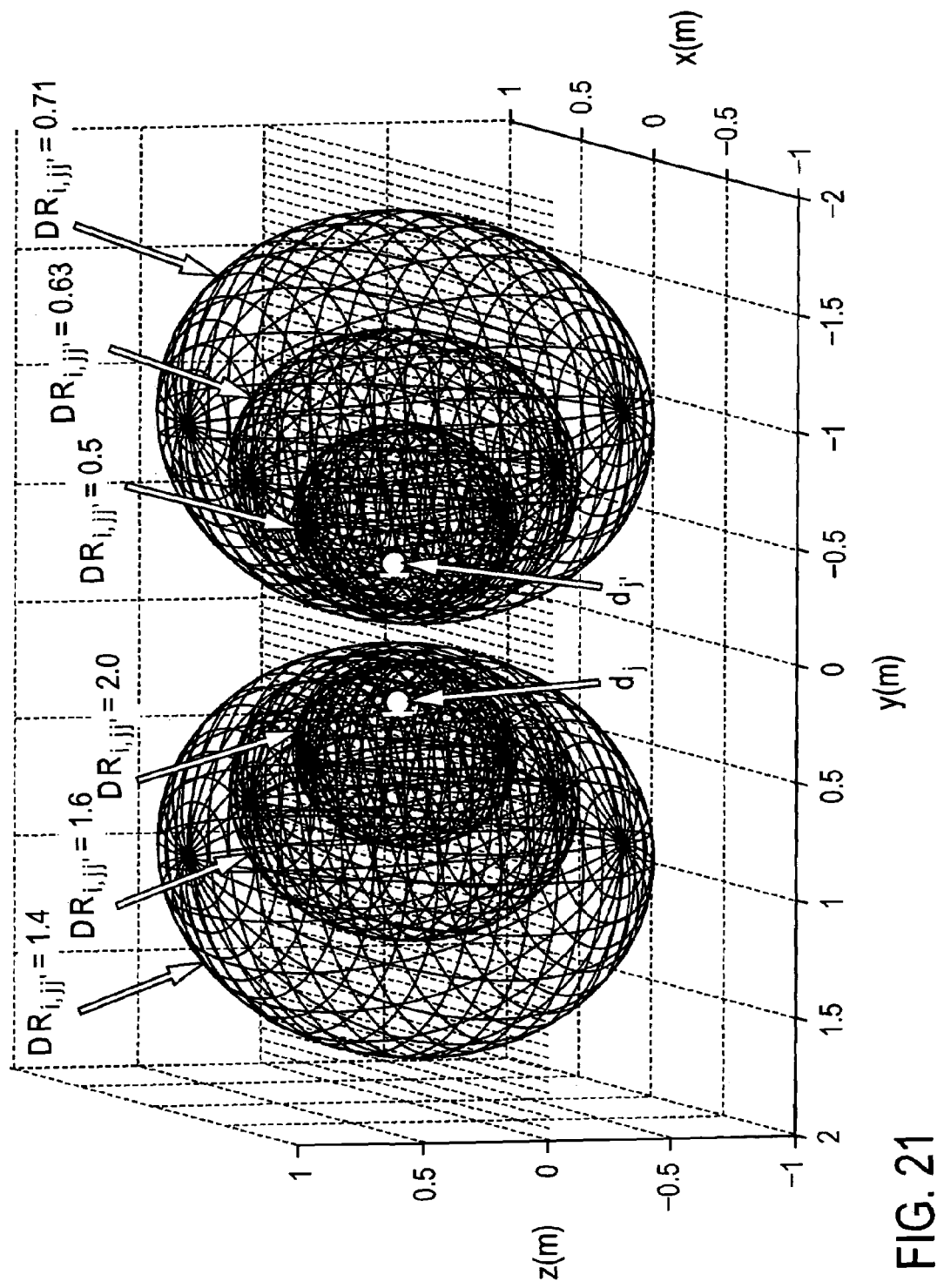
FIG. 21 is a graphical illustration of an example of an estimated spherical surface.

By way of example, when the sensors $1_{j'}$ and $1_j$ are located such that $d_j=(0, 0.15, 0)$ and $d_j'=(0, -0.15, 0)$ where the unit is given in meter, the spherical surface which is determined by the equation (10') will appear as shown in FIG. 21 when the radius $R_{i,jj'}(\omega)$ is used as a parameter.

This means that the signal source i exists on the spherical surface given by the equations (11) and (12) which serve as positional information. Accordingly, the distance estimator 17d of the permutation solver 17 shown in FIG. 17 may be treated as a curved surface estimator, as indicated in parenthesis, in order to calculate the radius $R_{i,jj'}(\omega)$ and the center $O_{i,jj'}(\omega)$ appearing in the equation (11) in the curved estimator 17d for the parameter i and jj' for which direction information $u_i(\omega)$ could not have been determined, as indicated in parenthesis at step S36 shown in FIG. 18. A permutation matrix $P(\omega)$ may be determined so that $R_{i,jj'}(\omega)$ and the center $O_{i,jj'}(\omega)$ assume an identical sequence for any inverse matrix $H(\omega)$ of any frequency.

Where the permutation matrix $P(\omega)$ cannot be determined if the conical surface information $\hat{\theta}_{i,jj'}(\omega)$ or direction information $u_i(\omega)$ in combination with spherical surface information $DR_{i,jj'}(\omega)$ or $R_{i,jj'}(\omega)$ is used, a conventional correlation method (see, for example, H. Sawada et al "A robust and precise method for solving the permutation problem of frequency-domain blind source separation", in Proc. Intl. Symp. on Independent Component Analysis and Blind Signal Separation (ICA 2003), 2003, pp. 505–510) may be applied for such frequency or frequencies. As indicated in broken lines in FIG. 17, output signals $y_i(t), \ldots, y_1(t)$ which are separated by a signal separator 19 may be transformed into frequency domain signals $Y_1(\omega, m), \ldots, Y_1(\omega, m)$ in a frequency domain transformer 33 as is done in the frequency domain transformer 11, for example, and a correlation calculator 34 may calculate a correlation between a component of frequency domain signals $Y_1(\omega, m), \ldots, Y_1(\omega, m)$ corresponding to a frequency component $f_{ank}$ for which the permutation solver 17 failed to produce a permutation matrix and a frequency component of the frequency domain signals which is adjacent to $f_{ank}$ and for which the permutation matrix has been successfully obtained. The permutation solver 17 performs a permutation of rows of the separation matrix for the frequency $f_{ank}$ so as to increase the correlation. A correlation is again calculated in the correlation calculator 33 for $f_{ank}$ component among separated output signals $y_1(t), \ldots, y_1(t)$ which are based on a row permutated separation matrix. This process is repeated until a calculated correlation reaches a maximum value. If a maximum value of the correlation cannot reach a given value, a sum of correlations between the funk component and those frequency components for which permutation matrix has been obtained and which are in a relation of a fundamental wave or a harmonic wave relationship (generally, a harmonic wave relationship is chosen) with respect to $f_{ank}$ is calculated in the correlation calculator 34, and a permutation of rows in the separation matrix for $f_{ank}$ is repeated in a modifier 17e so that the sum of correlation increases until the sum of correlations reaches a maximum value. Where the separation matrix $W(\omega)$ is applied to the frequency domain signal $X(\omega, m)$ to determine frequency domain separated signal $Y(\omega, m)$ as mentioned above in connection with the second embodiment, this $Y(\omega, m)$ may be used in the calculation of the correlation calculator 34.

Figure 22:
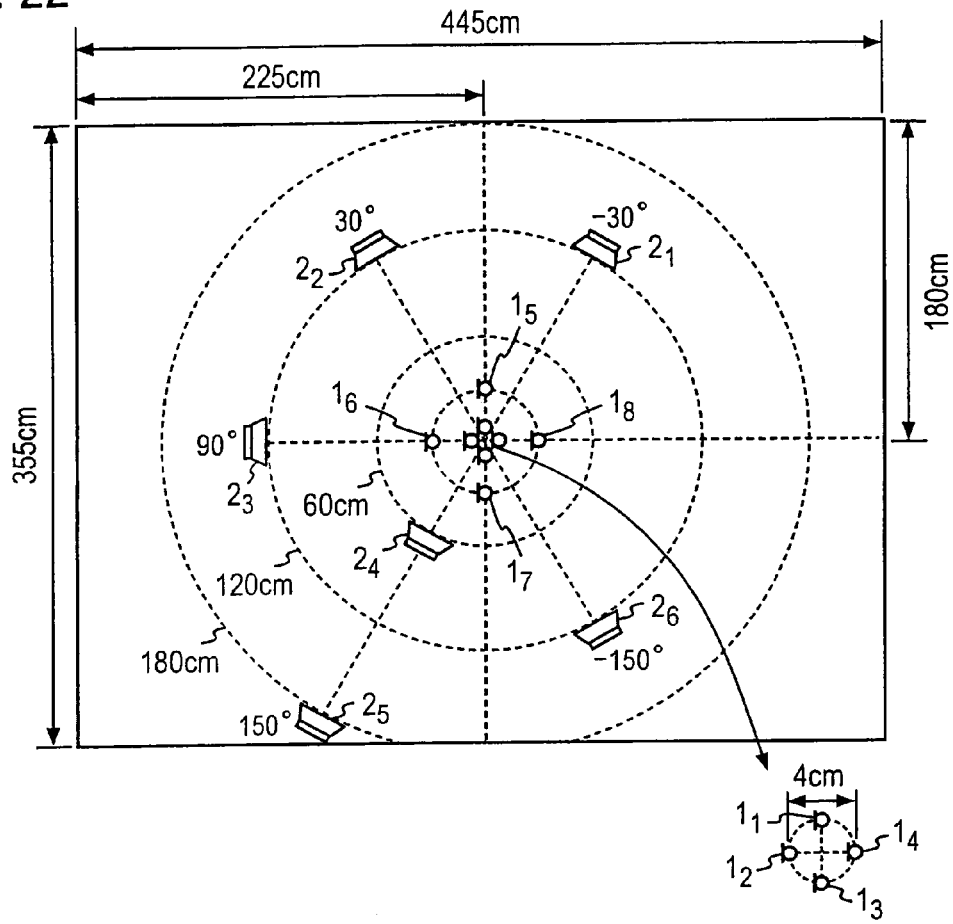
FIG. 22 is a view showing a room used in a experiment and its relationship with respect to microphones and sound sources.

An experimental example of the third embodiment will now be described in which a separation experiment has been conducted using a mixed voice as a signal source in which impulse responses which are actually measured in a room are convoluted. As shown in FIG. 22, sensors comprise non-directional microphones $1_1$ to $1_4$ which are disposed in a horizontal plane on a circle having a diameter of 4 cm at an equal interval so that their centers are located at a elevation of 135 cm in a room which measures 355 cm×445 cm×250 cm (height) and having a reverberant time of 130 milliseconds (the microphones $1_1$ to $1_4$ are shown to an enlarged scale in a right downward portion of this FIGURE), and non-directional microphones $1_5$ to $1_8$ disposed on a circle having a diameter of 30 cm at an equal interval, in a manner such that microphones $1_1$, $1_3$, $1_5$, $1_7$ form an linear array as are the microphones $1_2$, $1_4$, $1_6$, $1_8$. Choosing a direction from the microphone $1_1$ to the microphone $1_5$ as a reference (0°) and choosing the center of the disposition of the microphones as the origin, a sound source $2_1$ is disposed in a minus 30° direction, a sound source $2_2$ in a plus 30° direction, a sound source $2_3$ in a plus 90° direction and a sound source $2_6$ in a minus 150° direction, all spaced by 120 cm from the origin, a sound source $2_4$ is disposed in 150° direction and at a spacing of 60 cm from the origin, and a sound source $2_5$ is disposed in 150° direction and at a spacing of 180 cm from the origin. A sampling frequency of 8 kHz, a data length of 6 seconds, a frame length of 2048 samples (256 milliseconds) and a frame shift of 512 samples (64 milliseconds) are employed.

Figure 23:
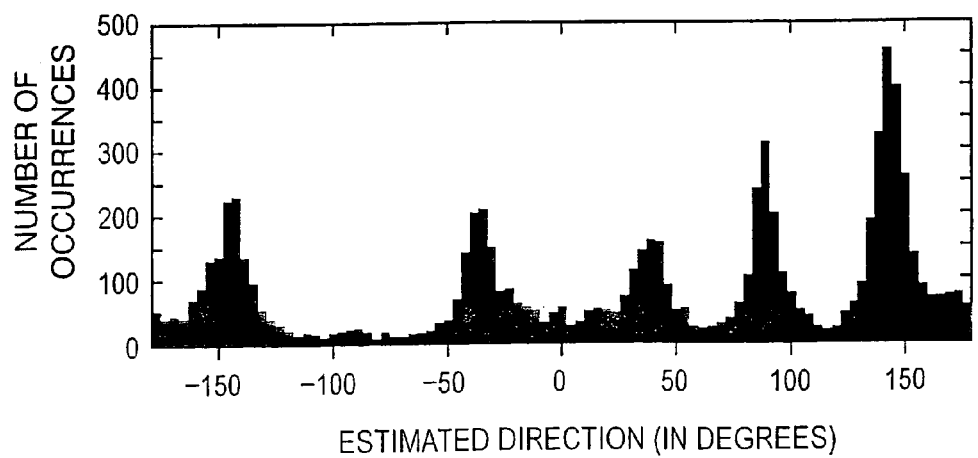
FIG. 23 is a histogram of estimated directions which are obtained by using a closely spaced microphone pair.
Figure 24:
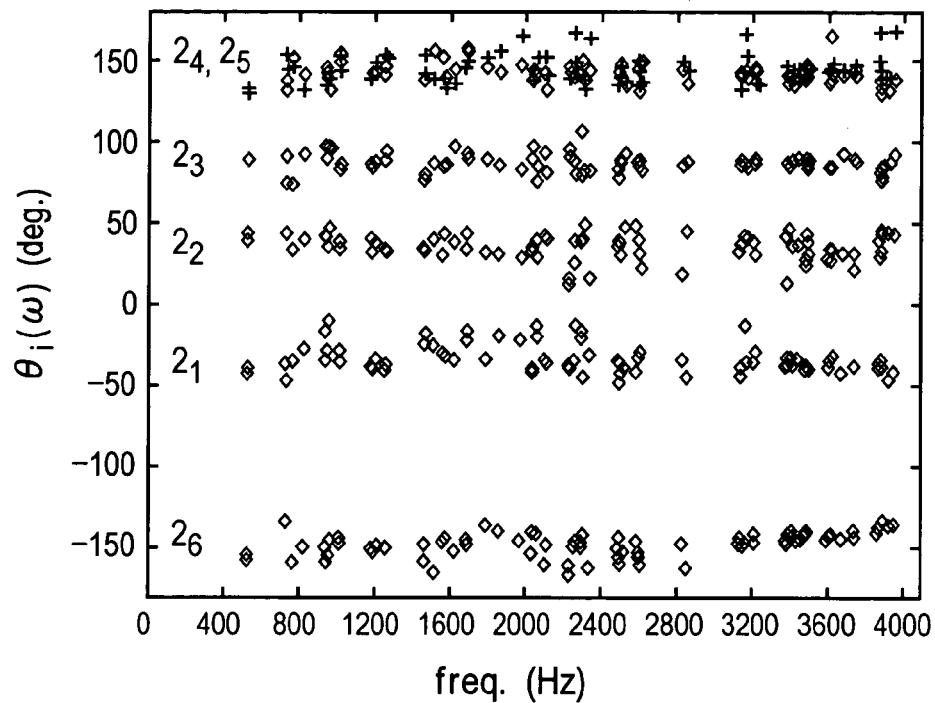
FIG. 24 graphically shows a distribution of estimated directions plotted against the frequency.

An estimation of direction of sound source (conical surface) is made using rows of the INVERSE $H(\omega)$ frequency domain separation matrix $W(\omega)$ which correspond to the microphone pair $1_1$ and $1_3$, $1_2$ and $1_4$, $1_1$ and $1_2$, and $1_2$ and $1_3$. The histogram of the estimated diretions is shown in FIG. 23 where the abscissa represents an estimated direction and the ordinate the number of occurrences. It is seen that estimated directions are in five clusters, and the cluster located around 150° is as large as twice other clusters. This allows an estimation that two of six sound sources are oncoming from a same direction (around 150°). For four sound sources, the permutation problem has been solved on the basis of estimated directions, with a result as shown in FIG. 24 where the abscissa represents a frequency and the ordinate a direction (in degrees).

Figure 25:
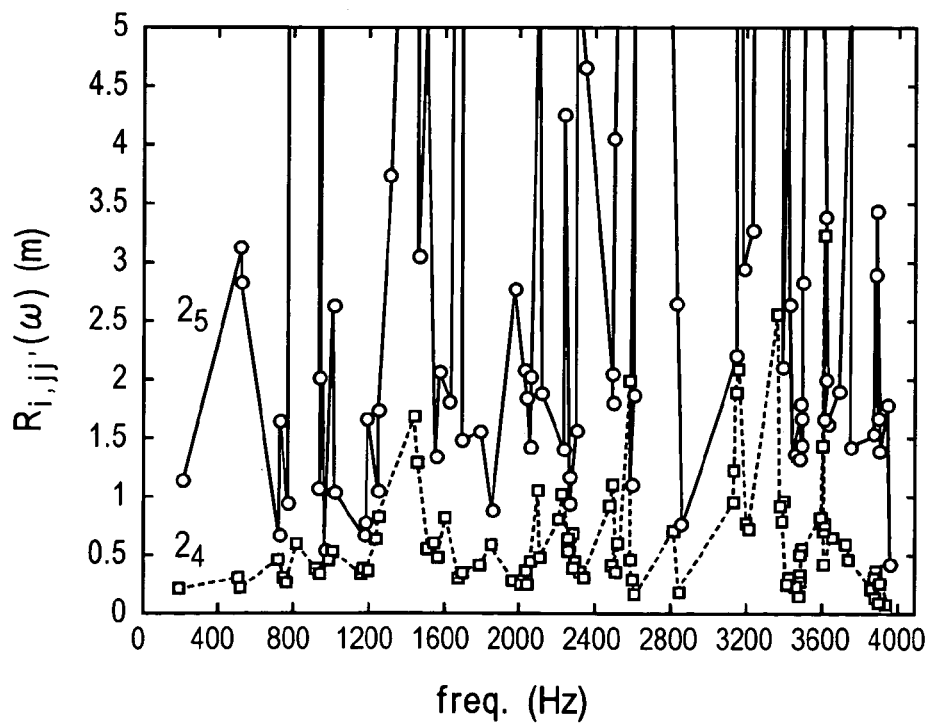
FIG. 25 graphically shows a distribution of the radius of an estimated spherical surface for sound sources $2_4$ and $2_5$ plotted against the frequency.

For two remaining sound sources, oncoming signals have been discriminated in accordance with the radius of a spherical surface on which a sound source may exist, using widely spaced microphone pairs $1_7$ and $1_5$, $1_7$ and $1_8$, $1_6$ and $1_5$, and $1_6$ and $1_8$. The radius of a spherical surface which is estimated using the microphone pair $1_7$ and $1_5$ is shown in FIG. 25 where the abscissa represents a frequency and the ordinate a radius (m).

Figures 26, 27:
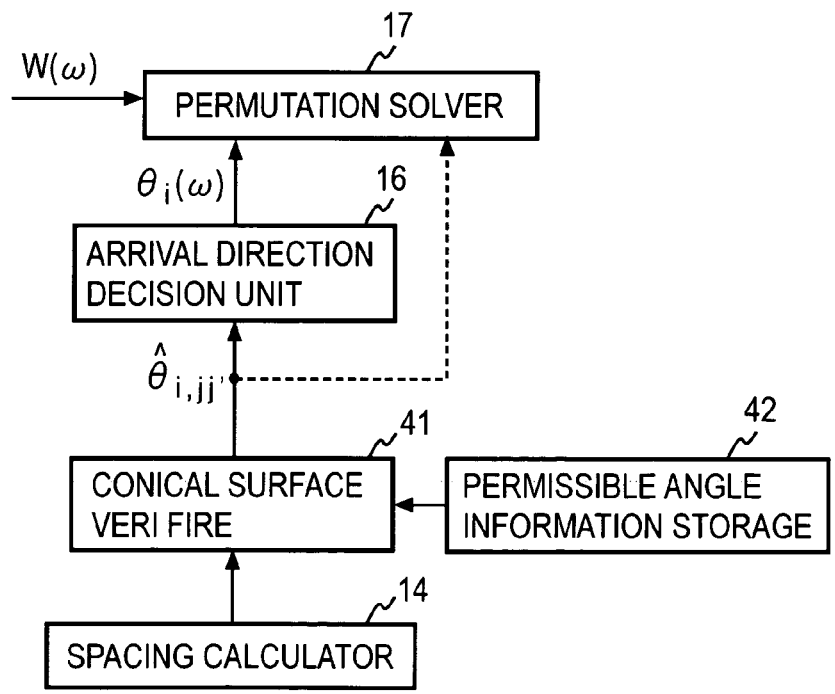
FIG. 26 is a table listing results of experiments obtained with various methods.
FIG. 27 is a block diagram of a functional arrangement of an essential part of a fourth embodiment of the present invention.

It is impossible to solve the permutation problem completely on the basis of positional information alone due to influences of reverberations and errors of the estimation. Accordingly, for frequencies for which signals could have been sorted without contradiction on the basis of the estimated positional information, a permutation matrix is produced on the basis of such information, and for remaining frequencies, the approach which is based on the correlation is used to solve the permutation problem. Lastly, a spectral smoothing has been made when determining separation filter coefficients in the time domain. For the spectral smoothing, see, for example, H. Sawada et al, "Spectral smoothing for frequency-domain blind source separation", in Proc. IWAENC 2003, 2003, pp. 311–314. An evaluation result of the separation performance (SIR) is indicated in FIG. 26 where numerical values are in unit of dB, and in this table, C represents the use of the correlation method alone to solve the permutation problem, D+C represents the use of the estimation of a direction (conical surface) to solve the permutation problem while using the correlation method for a failure of solving the permutation problem, and D+S+C indicates the use of estimation of a direction (conical surface) and an estimation of a spherical surface to solve the permutation problem while using the correlation method for frequencies for which the permutation problem could not have been solved. By using the latter method, all of six sound sources can be separated, and an improvement of SIR over the input SIR is calculated to be 17.1 dB as an average.

In the second embodiment, sensors are disposed in two dimensions, but because a spherical surface which is estimated by a pair of sensors appears symmetrically with respect to a bisector of the sensors, where a signal source exists in three dimensions, it cannot be determined using sensors disposed in two dimensions, requiring that sensors be also disposed in three dimensions.

As discussed above, in the third embodiment, conical surface information is estimated according to the equation (9') and curved surface information is estimated according to the equation (10'), and therefore the amount of calculation is reduced. In addition, since the permutation problem is solved by a combination of the conical surface and one of the distance ratio $DR_{i,jj}(\omega)$ or the distance $\|q_i(\omega)\|$ or the radius $R_{i,jj}(\omega)$ of the spherical surface, if two or more signal sources are located in a same direction or closely adjacent directions, they can be discriminated. When the correlation method is added, it is possible to achieve a more reliable separation. It will be seen that $DR_{i,jj}(\omega)$ is preferred as spherical information because this simplifies the calculation.

Fourth Embodiment

Figure 4A:
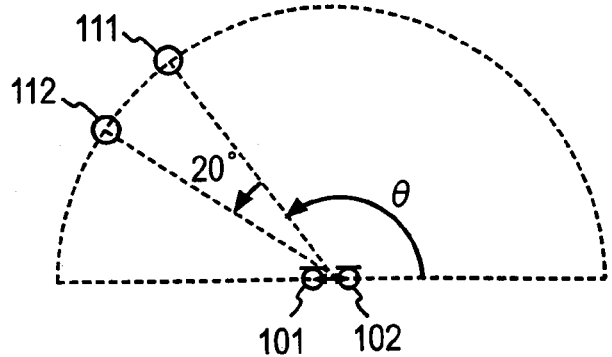
FIG. 4A is a diagram illustrating a relationship between sensors and signal sources which are used in a preliminary experiment.
Figure 4B:
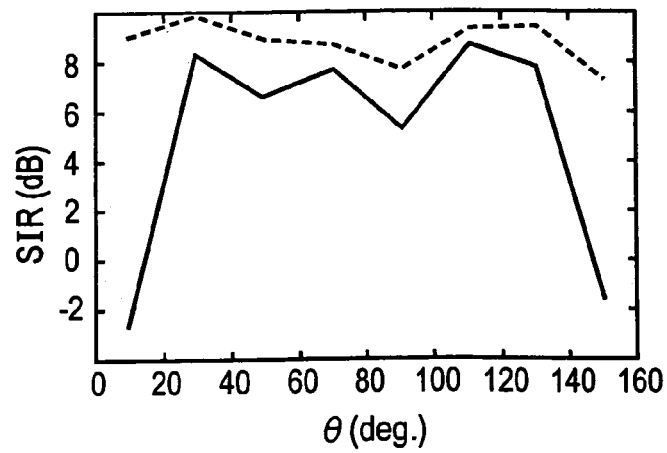
FIG. 4B graphically shows a result of the preliminary experiment.

In a fourth embodiment, the reliability of an estimated conical surface is verified, and a conical surface which has been determined as having a high reliability is used in solving the permutation of the separation matrix. As illustrated in FIG. 27, for example, conical surface information $\hat{\theta}_{i,jj}(\omega)$ estimated by the conical surface estimator 14 is verified in a conical surface verifier 41 whether it has a reliability or not on the basis of permissible angle information fed from a permissible angle information storage 42. Specifically, the angle $\hat{\theta}_{i,jj}(\omega)$ determined in accordance with the equation (9') represents a relative angle with respect to the direction of an array of sensors $\mathbf{1}_j$ and $\mathbf{1}_{j'}$ which are used in obtaining this angle, and as described above with reference to FIG. 4B, when an angle $\hat{\theta}_{i,jj}(\omega)$ is around 0° or 180°, it is supposed that the permutation cannot take place correctly.

For this reason, a minimum value $\theta_{min}$ and a maximum value $\theta_{max}$ which are estimated as permitting the permutation to take place properly are stored as a permissible angle information in the permissible angle storage 42. If the estimated conical surface information $\hat{\theta}_{i,jj}(\omega)$ lies between $\theta_{min}$ and $\theta_{max}$, it is determined to be a reliable conical surface in the conical surface verifier 41 to be delivered, namely, it can be used in solving the permutation problem. However, if it is not located between $\theta_{min}$ and $\theta_{max}$ that $\hat{\theta}_{i,jj}(\omega)$ is discarded as lacking the reliability and is not used in solving the permutation. For example, a conical surface $\mathbf{4}_{13}$ shown in FIG. 15 is discarded.

Conical surface information $\hat{\theta}_{i,jj}(\omega)$ which is verified to be reliable by the conical surface verifier 41 is fed to the arrival direction decision unit 16 shown in FIG. 12 or is directly fed to the permutation solver 17 as described above with reference to FIG. 17. As a step S100, which is indicated by broken lines extending from step S14 in the processing procedures shown in FIGS. 13 and 18, a verification is made to see whether or not the estimated conical $\hat{\theta}_{i,jj}(\omega)$ has a reliability and a transfer to the next step occurs only when it is determined to have the reliability. Denoting an error contained in the arg $(H_{ji}/H_{j'i})$ which is calculated according to the equation (9') by $\Delta$ arg $\hat{H}$ and an error contained in the estimated angle $\hat{\theta}_i$ by $\Delta\hat{\theta}$, a ratio therebetween $|\Delta\hat{\theta}/\Delta\ \mathrm{arg}\ \hat{H}|$ can approximated as follows by taking a partial derivative of the equation (9'):

$$|\Delta\hat{\theta}/\Delta\ \mathrm{arg}\ \hat{H}|=|1/(\omega c^{-1}|d_j-d_{j'}|\sin\hat{\omega}_{D})| \quad (13)$$

Figure 4C:
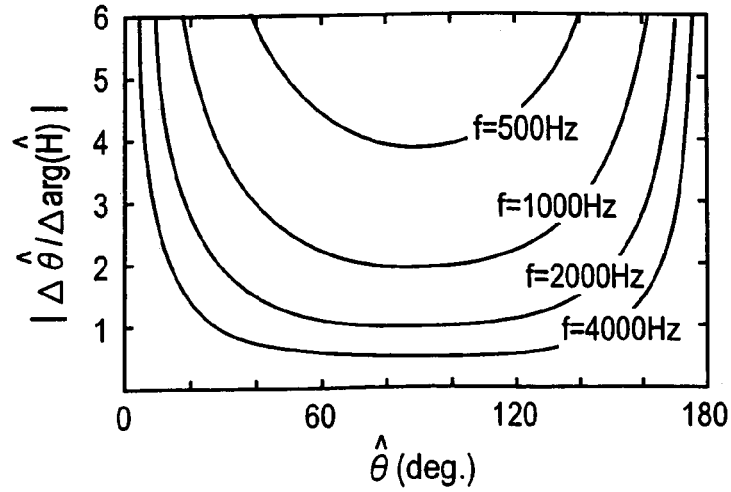
FIG. 4C graphically shows a relationship between an estimated direction and its sensitivity to a mixing matrix estimation error.

The equation (13) has been calculated for several frequencies, and results are shown in FIG. 4C. It is seen from FIG. 4C that if the estimated direction indicated by the estimated angle $\hat{\theta}_i$ is close to the sensor pair axis between the sensors $\mathbf{1}_j$ and $\mathbf{1}_{j'}$, the error $\Delta$ arg $\hat{H}$ contained in arg $(H_{ji}/H_{j'i})$ causes a large error to be produced with respect to the estimated angle $\hat{\theta}_i$. In other words, when the permutation problem of the separation matrix $W(\omega)$ is solved using the estimated angle $\hat{\theta}_i$ which is located close to the sensor pair axis, there is a high likelihood that this does not provide a correct solution. It is seen from FIGS. 4B and 4C that $\theta_{min}$ is on the order of 20° and $\theta_{max}$ is on the order of 160°, for example. As will be understood from FIG. 4C, $|\Delta\hat{\theta}/\Delta\ \mathrm{arg}\ \hat{H}|$ varies considerably depending on the frequency, and $\Delta$ arg $\hat{H}$ has a great influence on an error of the arrival direction at low frequencies. Accordingly, for low frequencies, it is desirable that the permutation problem be solved by using information $DR_{i,jj}$, $\|q_i\|$, $R_{i,jj}$, which are based on the estimation of a spherical surface on which a signal source exists or by the correlation method.

In the fourth embodiment, estimated conical surface information which lacks the reliability is discarded, and accordingly, the arrival direction could be estimated correctly in that it is not adversely influenced by non-reliable information, and accordingly, a correct permutation matrix $P(\omega)$ can be produced to improve SIR (performance) of separated signals.

Fifth Embodiment

Figure 28:
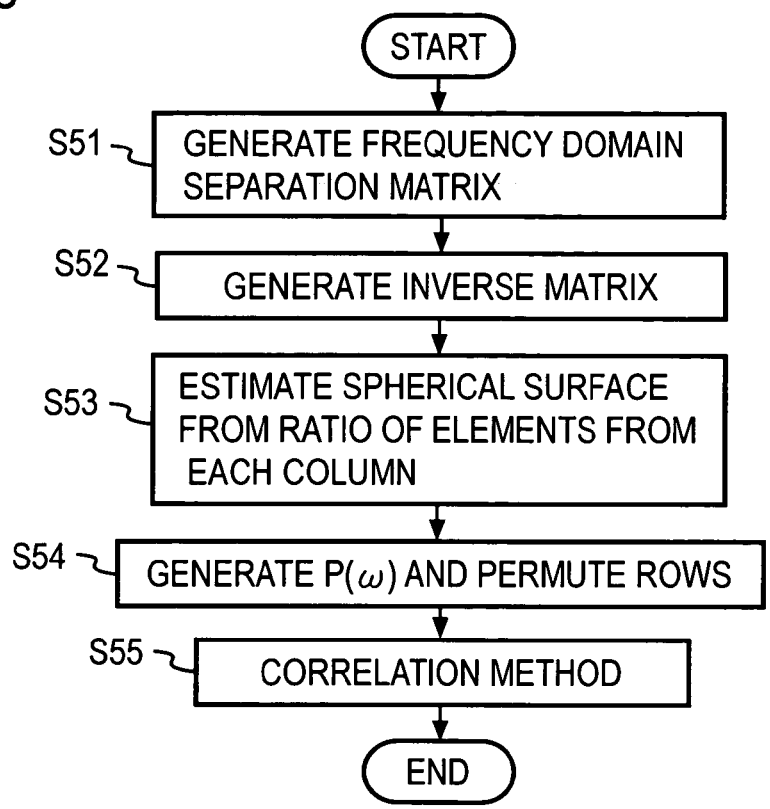
FIG. 28 is a flow chart of an exemplary processing procedure for a fifth embodiment in which the present invention is applied to the blind signal separation.

A fifth embodiment uses the distance ratio or spherical surface information which is estimated therefrom as positional information. A functional arrangement therefor is shown in FIG. 17. FIG. 28 schematically shows a processing procedure of the fifth embodiment. In this instance, sensors are relatively widely spaced, for example, may be spaced apart by 30 cm when signal sources shown in FIG. 22 comprise sound sources, and are disposed in at least two dimensions.

In the similar manner as the preceding embodiments, the time domain observed signals are transformed into frequency domain signals as indicated in FIG. 17, and a separation matrix generator 12 generates a separation matrix $W(\omega)$ (step S51), whereby an inverse matrix $H(\omega)$ is generated in an inverse matrix generator 13 (step S52). Spherical information is estimated for each column of the inverse matrix $H(s)$ for each frequency (step S53). Such spherical surface information is calculated in the similar manner as described above in connection with the third embodiment. Thus, spherical information comprises the distance ratio $DR_{i,jj}(\omega)$ calculated by the distance calculator 31, $\|q_i\|$ calculated by the distance estimator or curved surface estimator 17d or the radius $R_{i,jj}(\omega)$ and the center $O_{i,jj}(\omega)$.

A permutation matrix which is to operate upon the separation matrix $W(\omega)$ is produced using such spherical surface information so that the sequence in which such information appears assumes a predetermined sequence, and the permutation of rows of the separation matrix $W(\omega)$ takes place (step S54). In the third embodiment, this processing operation has taken place in the permutation solver 17, but in the fifth embodiment, only spherical surface information is used. If there is a frequency for which the permutation problem cannot be solved with spherical surface information alone, the permutation problem is solved according to the correlation method mentioned above for such frequency (step S55).

Figure 29:
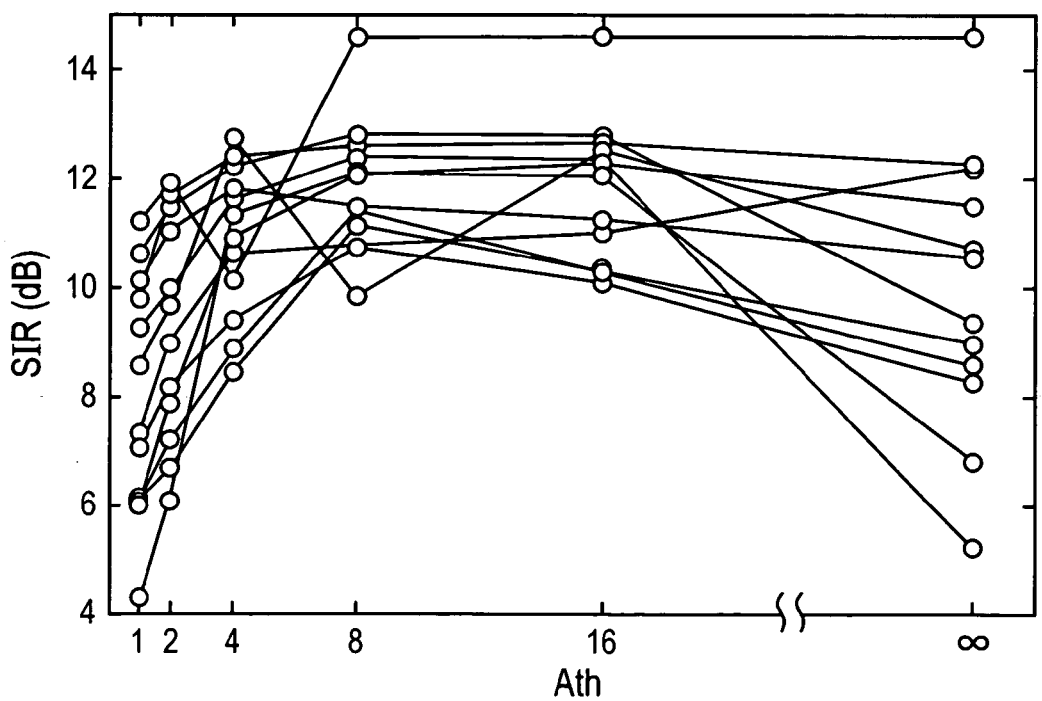
FIG. 29 graphically shows results of experiments conducted with the fifth embodiment.

A separation experiment has been conducted for twelve combinations mixed voices which are of impulse responses which are measured in the experiment room convoluted with voices of four speakers by using the microphones $\mathbf{1}_6$ and $\mathbf{1}_8$ disposed within the room in the manner shown in FIG. 22 and sound sources $\mathbf{2}_4$ and $\mathbf{2}_5$ disposed in 120° direction at distances of 60 cm and 150 cm, respectively, from the origin. The permutation problem has been solved by comparing estimated radii $R_{4,68}(\omega)$ and $R_{5,68}(\omega)$ against each other, and making a choice such that $R_{4,68}(°) \leq R_{5,68}(\omega)$ applies. An approach which relies on the position of sound sources is applied for a frequency for which a maximum value among $R_{4,68}(\omega)$ and $R_{5,68}(\omega)$ is equal to or greater than a minimum value among $R_{4,68}(\omega)$ and $R_{5,68}(\omega)$ multiplied by a threshold value Ath or for which $\max(R_{4,68}(\omega), R_{5,68}(\omega)) \geq$ Ath·min $(R_{4,68}(\omega), R_{5,68}(\omega))$ is satisfied. It based on the determination that a solution of the permutation problem according to the position of sound sources $(R_{4,68}(\omega), R_{5,68}(\omega))$ is reliable. And an approach according to the correlation is applied for other frequencies. Accordingly, when Ath=1.0, the approach according to the position of the sound sources is applied to every frequency, and when Ath is infinity, the approach according to the correlation is applied for every frequency. The separation performance or SIR (signal interference ratio) is plotted for different combinations of voices while changing the threshold value Ath as shown in FIG. 29. It is seen from the results shown in FIG. 29 that the approach according to the position of sound sources alone results in a poor performance as a whole while the approach according to the correlation alone produces variations, while a combination of the both approaches provide a stabilized high performance. It is found that a relatively high value is preferable for the threshold value Ath, and when it is chosen in a range from 8 to 16, the approach according to the position of the sound sources is effective for ⅕ to ⅒ of the entire frequencies.

A result of an experiment which used the approach according to the position of the sound sources and the approach according to the correlation in combination under the conditions shown in FIG. 22 is indicated in the row (D+C) in FIG. 26. It is seen that when the both approaches are used in combination, a separation can be achieved with a fairly good performance. This result exhibits a similar tendency as when the approach according to the arrival direction (conical surface information) which uses the equation (9') and the approach according to the correlation are used in combination. An experiment result obtained when the approach according to the arrival direction and the approach according to the correlation are used in combination is indicated in the literature cited in the description of the approach according to the correlation.

With the fifth embodiment, spherical surface information is determined according to the equation (10'), and accordingly, the amount of calculation is reduced. The distance ratio $DR_{i,jj}(\omega)$ is preferred as spherical surface information.

Sixth Embodiment

A sixth embodiment intends to solve the permutation problem based on a single estimated conical surface, for example. Conical surfaces $\hat{\theta}_{i,jj}(\omega_1), \ldots, \hat{\theta}_{i,jj}(\omega_N)$ which are estimated in the conical surface estimator 14 are directly input to the permutation solver 17 as indicated in broken lines in FIG. 12, and the estimated conical surface $\hat{\theta}_{i,jj}(\omega_n)$ (n=1, . . . , N) which is estimated at step S14 is used in step S16, by passing step S15 as indicated in broken lines in FIG. 13, in calculating a permutation matrix P(ω) so that $\hat{\theta}_{i,jj}(\omega_n)$ assumes an ascending order, for example, for any frequency.

In this instance, a single conical surface may only be estimated for each signal source i at step S14. While not shown, when a permutation of rows failed, a permutation of rows may be performed according to the correlation method which is mentioned above.

According to the sixth embodiment, the scaling problem is simply eliminated by forming a ratio of two elements in each column of the inverse matrix H(ω), and what is required is the calculation according to the equation (9'), whereby a calculation time can be reduced.

Summary of Signal Separation

A method of producing a separation matrix after the permutation problem has been solved during the blind signal separation is illustrated in FIGS. 30A, 30B and 30C for a processing operation which occurs subsequent to the generation of an inverse matrix. In FIG. 30A, a conical surface is estimated on the basis of a ratio of elements from each column of the inverse matrix (step S61), non-reliable conical surfaces are destroyed as required (step S62), the direction of a straight line which is common to a plurality of conical surfaces is determined (step S63), a permutation matrix P(ω) is generated using the direction of the common straight line to perform a permutation of the separation matrix (step S64), and a permutation of rows of the separation matrix is performed according to the correlation method for frequencies for which the permutation problem could not have been solved (step S65). As shown in broken lines in FIG. 30A, it is also possible to transfer from step S61 to S64 directly, directly using the conical surfaces to generate the permutation matrix P(ω).

In FIG. 30B, a conical surface is estimated at step S61 and a conical surface or surfaces are discarded as required at step S62, the direction of a common straight line is estimated at step S63, and such direction of common straight line is used to perform a permutation of columns of the inverse matrix (step S66). In this instance, as indicated in broken lines in this Figure, a conical surface which is estimated at step S61 or a conical surface which remains after S62 may be directly used in the processing operation at step S66. If the estimation of the conical surface or the determination of the direction of the common straight line fails or if the conical surface or the direction of the common straight line is uncertain or assumes an identical as others, spherical information is estimated on the basis of the ratio of elements in a column of the inverse matrix (step S67), the estimated spherical information is used to performe a permutation of the inverse matrix to produce a permutation matrix P(ω) for purpose of the permutation of rows in the separation matrix (step S64). For a frequency or frequencies for which the permutation matrix P(ω) could not have been formed, the approach according to the correlation is applied (step S65).

In FIG. 30C, spherical information is initially estimated from the ratio of elements of each column of the inverse matrix (step S68), the spherical information is used to perform a permutation of columns in the inverse matrix (step S69), and if the permutation of the columns fails or the spherical information were uncertain, a conical surface is estimated on the basis of the ratio of elements in a column of the inverse matrix (step S70). The direction of a straight line which is common to a plurality of conical surfaces is determined (step S71), and the direction thus determined or the conical surface or surfaces which are estimated at step S70 are directly used to perform a permutation of columns in the inverse matrix to generate a permutation matrix P(ω), and the permutation in the separation matrix is performed (step S64). For a frequency or frequencies for which the permutation could not have been formed, the correlation method is applied (step S65).

In addition, there is an approach which is shown in FIG. 28.

The signal separation may take place using the frequency domain separation matrix W(ω) and the observed signal X(ω), and subsequently separated frequency domain signal Y(ω) may be transformed into the time domain signal y(t) in the third, the fifth and the sixth embodiment in the similar manner as described above in connection with the second embodiment.

In the description of the first embodiment, the estimation of the arrival direction of the signal in two dimensions is made, but it is also applicable to the estimation of the arrival direction of the signal in three dimensions as mentioned above in connection with the second embodiment. The second to the sixth embodiment are applicable to the signal separation in two dimensions. In this instance, the estimated conical surface $\hat{\theta}_{i,jj}(\omega)$ assumes two directions which are located symmetrically with respect to the sensor axis of the sensor pair which is used in the estimation, and the estimated spherical surface $R_{i,jj}(\omega)$ or $DR_{i,jj}(\omega)$ will be the radius of the circle or a substantial equivalent thereto.

The apparatus shown in FIGS. 5, 12 and 17 as well as the apparatus shown in the fifth embodiment may be implemented by computer functions. In such instance, a corresponding processing procedure, namely, the flow chart of steps shown in FIGS. 6, 13 and 18 may be installed into a memory in the computer from a magnetic disk, a semiconductor memory, CD-ROM or the like which stores a program for causing the computer to execute such steps or the program may be downloaded into a memory in the computer through a communication network to cause the computer to execute the program.

What is claimed is:

1. An apparatus for estimation of positional information of signal sources in which signals radiated from I signal sources are detected by J sensors to determine positional information of the signal sources where I is an integer equal to or greater than 2 and J is an integer equal to or greater than I, comprising frequency domain transforming means for transforming observed signals from respective sensors into frequency domain signals;

separation matrix calculating means for calculating a first separation matrix which separates signals from the signal sources for each frequency by the independent component analysis from the frequency domain signals;

inverse matrix calculating means for calculating an inverse matrix of each of the first separation matrices, the inverse matrix being inclusive of a pseudo-inverse matrix;

and positional information calculating means for calculating positional information of one of signal sources on the basis of the ratio of two elements in each column of at least one of the inverse matrices for respective frequencies.

2. An apparatus as defined in claim 1 in which said positional information calculating means is means for determining positional information of each signal source by calculating positional information based on the ratio of elements for each column of a plurality of inverse matrices for respective frequencies, said means comprising, permutation matrix generating means for generating a permutation matrix on the basis of positional information of the signal sources for respective frequencies, the permutation matrix performing a permutation of rows in the separation matrix so that rows corresponding to the positional information, in the separation matrices, for frequencies corresponding to the plurality of inverse matrices assume a predetermined sequence, and permuting means for multiplying the permutation matrix and the first separation matrix together to obtain a second separation matrix in which rows are permuted.

3. An apparatus as defined in claim 2 in which said J is equal to or greater than 3 and the J sensors are disposed in at least two dimensions and in which said positional information is a conical surface including a direction from said sensor to said signal source and on which the signal source exists, the positional information calculating means comprising means for performing the calculation of the conical surface on the basis of the ratio of elements from each column for a plurality of sets of two elements, and arrival direction determining means for estimating the direction of a straight line which is in common to a plurality of conical surfaces for respective frequencies as the positional information.

4. An apparatus as defined in claim 2 in which said J is equal to or greater than 3 and in which the positional information contains a conical surface on which a signal source exists and a curved surface on which a signal source exists and contains a direction of the signal source with respect to an axis passing through a pair of sensors, the positional information calculating means comprising means for performing the calculation of the conical surface on the basis of the ratio of two elements, means for calculating a ratio of distances between another pair of sensors and the signal source from a ratio between two elements in the colunm of the inverse matrix corresponding to said another pair of sensors, said another pair of sensors having a spacing therebetween greater than that of the spacing of said pair of sensors used for calculation of the conical surface, and means for calculating the curved surface on the basis of the ratio of the distances, said permutation matrix generating means being means for generating a permutation matrix on the basis of the conical surface and the curved surface for each frequency.

5. An apparatus as defined in one of claims 2, 3 and 4 in which said J is equal to or greater than 3 and the J sensors are disposed in at least two dimensions and in which said positional information relates to a conical surface on which the signal source exists and includes the direction to the signal source as viewed from the sensor, further comprising decision means for deciding whether or not an angle defining the conical surface lies between a first and a second predetermined angle, the decision means rendering a conical surface having an angle lying between the first and the second angle as effective.

6. An apparatus as defined in claim 2 in which said J is equal to or greater than 3 and the J sensors are disposed in at least two dimensions, in which the positional information represents the radius of a spherical surface on which the signal source exists, and in which said positional information calculating means is means for calculating the ratio of distances on the basis of the ratio of two elements.

7. An apparatus as defined in claim 2 in which said positional information relates to a conical surface on which the signal source exists and includes the direction of the signal source as viewed from the sensor.

8. An apparatus as defined in one of claims 2, 3, 4, 6 and 7, further comprising, correlation calculating means for calculating a correlation between frequency components among frequency domain signals of those signals which are separated using the second separation matrix from the observed signals for which the permutation matrix generating means failed to produce a permutation matrix and frequency components for which a permutation matrix has been produced, and modifying means which permute rows in a separation matrix for a frequency for which the permutation matrix generating means failed to produce a permutation matrix so that the correlation increases.

9. An apparatus as defined in claim 1 in which the positional information represents direction information indicating a direction of the signal source as. viewed from the sensor, said positional information calculating means comprising means for calculating an argument of said ratio, means for calculating the product of a phase rotation per unit distance and the distance between the sensors which correspond to the two elements, means for dividing the argument by the product, and means for calculating an arccosine of a result of the division to deliver the direction information.

10. An apparatus as defined in claim 9 in which the positional information calculating means is means for calculating the direction information of one signal source for each frequency, and includes unifying means for unifying direction information calculated for each signal source and for each frequency to fix direction information.

11. A method of estimating positional information of signal sources in which signals radiated by I signal sources are detected by J sensors to determine positional information of the signal sources where I is an integer equal to or greater than 2 and J is an integer equal to or greater than 1, comprising the steps of
transforming observed signals from the sensors into frequency domain signals;
calculating a first separation matrix which separates signals from the signal sources for each frequency from the frequency domain signals by the independent component analysis;
calculating an inverse matrix of the first separation matrix, the inverse matrix being inclusive of a pseudo-inverse matrix;
and calculating positional information of one of said signal sources on the basis of the ratio of two elements of a column of at least one of inverse matrices for respective frequency, the two elements from one column being different from two elements from a different column.

12. A method as defined in claim 11 in which the step of calculating the positional information for each signal source comprises a step of calculating positional information on the basis of the ratio of elements of each column for a plurality of inverse matrices for respective frequencies, and said step comprises
generating a permutation matrix from the positional information for each signal source and for each frequency, the permutation matrix permuting rows in a manner such that rows in separation matrices corresponding to the plurality of inverse matrices and which correspond to the positional information assume a predetermined sequence,
and multiplying the permutation matrix and the first separation matrix together to provide a second separation matrix in which rows are permuted.

13. A program for causing a computer to execute each step of the method of estimating positional information of signal sources as defined in claims 11 or 12.

14. A method as defined in claim 12 in which $J \geqq 3$ and J sensors are disposed in at least two dimensions, the positional information including a direction of the signal source as viewed from the sensor and is a conical surface on which the signal source exists, the step of calculating the positional information comprising performing the calculation of the conical surface on the basis of the ratio of elements from each column for a plurality of different sets of two elements, and estimating the direction of a straight line which is in common to the plurality of conical surfaces for each frequency as the positional information.

15. A method as defined in claim 12 in which $J \geqq 3$ and the positional information includes a direction of the signal source as viewed from a pair of sensors and is a conical surface on which the signal source exists and a curved surface on which the signal source exists,
the step of calculating the positional information comprising calculating a conical surface on the basis of the ratio of two elements, calculating the ratio of the distances between a pair of sensors and one signal source from the ratio of two elements corresponding to the pair of sensors having a greater spacing therebetween than the spacing of the pair of sensors which correspond to the two element used in the calculation of the conical surface, and calculating a curved surface on the basis of the ratio of distances,
the step of generating a permutation matrix generating a permutation matrix on the basis of the conical surface and the spherical surface for each frequency.

16. A method as defined in claim 15 in which the step of generating a permutation matrix comprises the step of executing the step of calculating the positional information on the basis of one of the conical surface and the spherical surface and producing a first permuted matrix on the basis of the positional information obtained for one of the conical surface and the spherical surface, the first permuted matrix having its columns permuted so that the position information for one of the conical surface and the spherical surface, which corresponds to each column of an inverse matrix for each frequency, assume a predetermined sequence, and the step of executing the step of calculating the positional information on the basis of the other of the conical surface and the spherical surface for columns for which the step of generating the first permuted matrix failed to permute the columns and modifying the first permuted matrix on the basis of the positional information obtained for the other of the conical surface and the spherical surface to permute columns of the inverse matrix to provide a second permuted matrix, and calculating an inverse matrix of the second permuted matrix to provide a permutation matrix.

17. A method as defied in one of claims 12 to 16 in which $J \geqq 3$ and the J sensors are disposed in at least two dimensions and in which positional information includes a direction of the signal source as viewed from the sensor and representing a conical surface on which the signal source exists,
and further comprising the steps of
determining whether or not an angle representing the conical surface lies between a first and a second predetermined angle; and
destroying the conical surface when the angle does not lie between the first and the second angle.

18. A method as defied in claim 12 in which $J \geqq 3$ and J sensors are disposed in at least two dimensions, and in which the positional information represents the radius of a spherical surface on which the signal source exists, and the step of calculating the positional information is a step of calculating the ratio of distances on the basis of the ratio of two elements.

19. A method as defined in claim 12 in which the positional information includes the direction of the signal source as viewed from the sensor and represents a conical surface on which the signal source exists.

20. A method as defined in one of claims 12 to 16, 18 and 19 in which in the event the step of generating the permutation matrix fails to generate a permutation matrix for a frequency or frequencies, further comprising the steps of
calculating a correlation between frequency components of the frequency domain signals for signals which are separated from the observed signals by the second separation matrix for which the permutation matrix has been successfully generated and frequency components for which the step of generating the permutation matrix failed to generate a permutation matrix;
and generating a permutation matrix for the separation matrix for a frequency or frequencies for which the permutation matrix could not have been generated in a manner such that the calculated correlation increases.

21. A method as defined in claim 11 in which the positional information represents information indicating a direction of the signal source as viewed from the sensor, the step of calculating the positional information comprising dividing the argument of the ratio by the product of a phase rotation per unit distance and a distance between the sensors which correspond to the two elements and deriving an arccosine as represented by a result of the division to be delivered as direction information.

22. A method as defined in claim 21 in which the step of calculating the positional information is a step of calculating the direction information for one signal source for each frequency, and includes a unifying step which unifies direction information calculated for each signal source and for every frequency to fix direction information.

* * * * *